(12) United States Patent
Tong et al.

(10) Patent No.: US 7,867,677 B2
(45) Date of Patent: *Jan. 11, 2011

(54) IMAGING MEMBER HAVING FIRST AND SECOND CHARGE TRANSPORT LAYERS

(75) Inventors: Yuhua Tong, Webster, NY (US); John F. Yanus, Webster, NY (US); Jin Wu, Webster, NY (US); Steven M. Sterling, Walworth, NY (US); Susan M. VanDusen, Williamson, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/560,575

(22) Filed: Sep. 16, 2009

(65) Prior Publication Data

US 2009/0325094 A1    Dec. 31, 2009

Related U.S. Application Data

(63) Continuation of application No. 11/126,784, filed on May 11, 2005, now Pat. No. 7,618,757.

(51) Int. Cl.
  *G03G 5/047* (2006.01)
(52) U.S. Cl. ............... 430/58.8; 430/59.6; 430/58.75
(58) Field of Classification Search ............... 430/58.8, 430/58.75, 59.6
  See application file for complete search history.

(56) References Cited

U.S. PATENT DOCUMENTS

| | | | |
|---|---|---|---|
| 3,121,006 A | 2/1964 | Middleton et al. | |
| 3,590,000 A | 6/1971 | Palermiti et al. | |
| 3,849,182 A | 11/1974 | Hagenbach | |
| 3,900,588 A | 8/1975 | Fisher | |
| 4,264,672 A | 4/1981 | Taylor-Brown et al. | |
| 4,286,033 A | 8/1981 | Neyhart et al. | |
| 4,291,110 A | 9/1981 | Lee | |
| 4,298,697 A | 11/1981 | Baczek et al. | |
| 4,338,387 A | 7/1982 | Hewitt | |
| 4,338,390 A | 7/1982 | Lu | |
| 4,558,108 A | 12/1985 | Alexandru et al. | |
| 4,560,535 A | 12/1985 | Bouchee | |
| 4,560,635 A | 12/1985 | Hoffend et al. | |
| 4,727,009 A | 2/1988 | Takai | |
| 4,801,517 A | 1/1989 | Frechet et al. | |
| 4,806,443 A | 2/1989 | Yanus et al. | |
| 4,806,444 A | 2/1989 | Yanus et al. | |
| 4,818,650 A | 4/1989 | Limburg et al. | |
| 4,847,175 A | 7/1989 | Pavlisko et al. | |
| 4,935,487 A | 6/1990 | Yanus et al. | |
| 4,956,440 A | 9/1990 | Limburg et al. | |
| 4,999,268 A | 3/1991 | Ojima et al. | |
| 5,578,406 A | 11/1996 | Ojima et al. | |
| 6,824,940 B2 | 11/2004 | Wu et al. | |
| 7,618,757 B2 * | 11/2009 | Tong et al. | 430/58.8 |
| 2004/0115545 A1 | 6/2004 | Horgan et al. | |
| 2004/0126685 A1 | 7/2004 | Horgan et al. | |
| 2004/0161682 A1 | 8/2004 | Wu et al. | |
| 2005/0106482 A1 | 5/2005 | Kami et al. | |

FOREIGN PATENT DOCUMENTS

JP      2005037524 A    10/2005

* cited by examiner

*Primary Examiner*—Christopher RoDee
(74) *Attorney, Agent, or Firm*—Fay Sharpe LLP

(57) ABSTRACT

Provided is an imaging member such as photoreceptor comprising a substrate, a charge generation layer, a first charge transport layer, a second charge transport layer, and an optional overcoat layer. The first charge transport layer is formed from a first CTL formulation comprising an aromatic monoamine and a first polymeric film forming binder material. The second charge transport layer is formed from a second CTL formulation comprising aromatic diamine and a second polymeric film forming binder material. The imaging member has gained improved properties such as removal of anti-curl layer, desirable structural flatness, electrical properties, mechanical robustness, flexibility, longevity, and copy image qualities over extended use, among others.

19 Claims, 2 Drawing Sheets

IMAGING MEMBER HAVING FIRST AND SECOND CHARGE TRANSPORT LAYERS

INCORPORATION BY REFERENCE

This is a continuation of U.S. Pat. application Ser. No. 11/126,784, filed May 11, 2005, now U.S. Pat. No. 7,618,757, issued Nov. 17, 2009, entitled "Imaging Member", the disclosure of which is hereby incorporated by reference in its entirety.

BACKGROUND

The present disclosure is generally directed, in various embodiments, to imaging members. More particularly, the disclosure relates to various embodiments of an imaging member such as photoreceptor comprising a substrate, a charge generation layer, a first charge transport layer, a second charge transport layer, and an optional overcoat layer. More particularly, the first charge transport layer is formed from a first CTL formulation comprising an aromatic monoamine and a first polymeric film forming binder material. The second charge transport layer is formed from a second CTL formulation comprising aromatic diamine and a second polymeric film forming binder material. The imaging member has gained improved properties such as removal of anti-curl layer, desirable structural flatness, electrical properties, mechanical robustness, and flexibility, among others.

Imaging members such as photoreceptors can be provided in a number of forms, such as rigid drum configuration and flexible belt configuration. For a flexible belt, it can be either seamless or seamed. For example, the photoreceptor can be a homogeneous layer of a single material, such as vitreous selenium; or it can be a composite layer containing a photoconductive layer and another material; or it can be layered. Current layered photoreceptors generally have at least a flexible substrate support layer and two active layers. These active layers generally include a charge generation layer containing a light absorbing material, and a charge transport layer containing electron donor molecules. These layers can be in any order, and sometimes can be combined in a single or a mixed layer.

Sometimes, however, tendency to curl is a problem associated with a photoreceptor belt. Curling is believed to be the result of differential thermal expansion of the individual layers within the photoreceptor. For example, when a production web stock of several thousand feet of coated multilayered photoreceptor is obtained after finishing the charge transport layer coating/drying process, it is seen to spontaneously curl upward toward the applied coating layers. The exhibition of spontaneous upward photoreceptor web stock curling after completion of charge transport layer coating has been determined to be the consequence of thermal contraction mismatch between the applied charge transport layer and the substrate support under the conditions of elevated temperature heating/drying the solution applied wet coating and eventual cooling down to room ambient temperature. Since the charge transport layer in a typical prior art photoreceptor device has a coefficient of thermal contraction approximately $3_{1/2}$ times larger than that of the substrate support, it does, upon cooling down to room ambient temperature, result in greater dimensional contraction than that of the substrate support, causing upward photoreceptor curling. What is worse, the curling may give rise to crackling, crazing and layer delamination.

To prevent curling, an additional anti-curling blocking coating (ACBC) layer may be applied to the side of the supporting substrate opposite the photoconductive layer to counteract the tendency to upward curling and ensure photoreceptor flatness. For example, US Patent Application Publication No. 2004/0072088 has disclosed several anti-curl back coating solutions. The contents of this application are incorporated entirely herein by reference. Some of the ACBC solutions were prepared in methylene chloride by combining a polyester resin (Vitel PE-200); and a polyphthalate carbonate resin (Lexan PPC 4701 having the following formula, available from GE Company), or a bisphenol A polycarbonate, or a polyether sulfone, or a polystyrene etc. The anti-curl back coating solution was then applied to the rear surface of a substrate (the side opposite the photoimaging layer) of the imaging member and dried at 135° C. to produce an optically transparent dried anti-curl back coating thickness of about 13.1 micrometers.

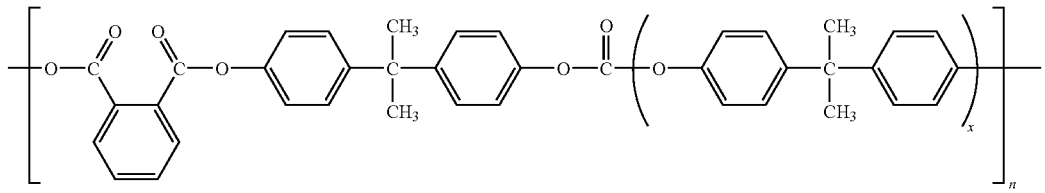

wherein x is an integer from about 1 to about 10, and n is the degree of copolymerization. Other ACBC solutions were prepared using styrene acrylonitrile copolymer and poly(1,4-cyclohexylene-dimethylene terephthalate) Eastar PETG copolyester; or using Makrolon 5705 and Eastar PETG; or Polysulfone, Ardel Polyarylate, or Polyphenylene Sulfone (all available from Amoco Performance Products, Inc.).

Generally, the ACBC layer must have very good wear resistance, good adhesion to the substrate and good physical stability during all applied environment. Also, the transparency and conductivity are necessary in some cases. Expensive and elaborate packaging are needed to obtain excellent ACBC for photoreceptors. Subsequent wear of the ACBC tends to cause debris in the xerographic cavity which leads to numerous problems.

As such, new solutions are needed to manufacture an imaging member such as photoreceptor, which does not require the anti-curl layer and still maintains desirable structural flatness, electrical properties, mechanical robustness, flexibility, longevity, and copy image qualities over extended use, among others.

BRIEF DESCRIPTION

In one exemplary embodiment, an imaging member is provided. The imaging member comprises a substrate, a charge generation layer, a first charge transport layer, a second charge transport layer, and an optional overcoat layer. The first charge transport layer is formed from a first CTL formulation comprising an aromatic monoamine and a first polymeric film forming binder material. The second charge transport layer is formed from a second CTL formulation comprising aromatic diamine and a second polymeric film forming binder material.

In another exemplary embodiment, a method of preparing an imaging member is provided. The method comprises (i) providing a substrate, (ii) coating a charge generation layer above the substrate, (iii) coating a first charge transport layer above the charge generation layer, (iv) coating a second charge transport layer above the first charge transport layer, and (v) optionally coating an overcoat layer above the second charge transport layer. The first charge transport layer is formed from a first CTL formulation comprising an aromatic monoamine and a first polymeric film forming binder material; and the second charge transport layer is formed from a second CTL formulation comprising aromatic diamine and a second polymeric film forming binder material.

In still another exemplary embodiment, a method of imaging is provided. The imaging method comprises generating an electrostatic latent image on an imaging member comprising a first charge transport layer and a second charge transport layer, developing the latent image, and transferring the developed electrostatic image to a suitable substrate.

These and other non-limiting embodiments will be more particularly described with regard to the drawings and detailed description set forth below.

BRIEF DESCRIPTION OF THE DRAWINGS

The following is a brief description of the drawings which is presented for the purposes of illustrating the disclosure set forth herein and not for the purposes of limiting the same.

DETAILED DESCRIPTION

Figure 1:
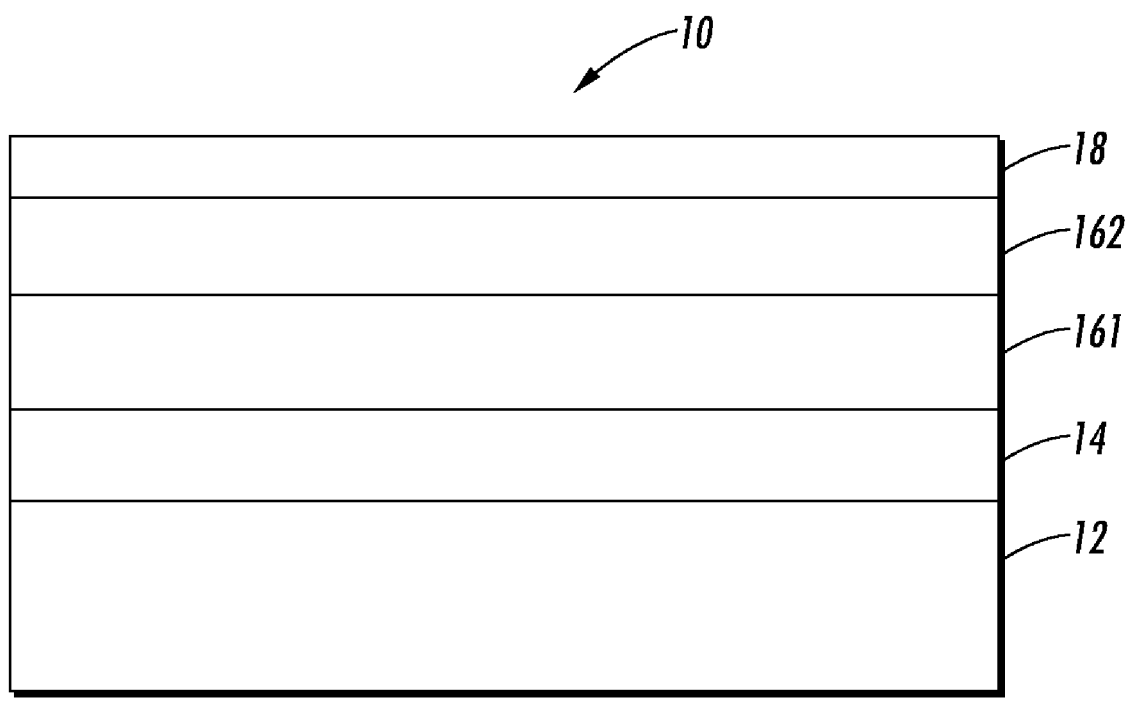
FIG. 1 is a schematic cross-sectional view of a photoconductive imaging member in accordance with the present disclosure.

The present disclosure relates to a photoconductive imaging member comprising a substrate, a charge generation layer, a first charge transport layer (CTL), a second charge transport layer, and an optional overcoat layer disposed over the second charge transport layer. The first charge transport layer is formed from a first CTL formulation comprising an aromatic monoamine and a first polymeric film forming binder material. The second charge transport layer is formed from a second CTL formulation comprising aromatic diamine and a second polymeric film forming binder material. The present disclosure also relates to a process for forming the photoconductive imaging member, the first charge transport layer, and the second charge transport layer.

Also included within the scope of the present disclosure are methods of preparing the imaging member as described supra.

Further included within the scope of the present disclosure are methods of imaging and printing with the photoresponsive devices illustrated herein. These methods generally involve the formation of an electrostatic latent image on the imaging member, followed by developing the image with a toner composition comprised, for example, of thermoplastic resin, colorant, such as pigment, charge additive, and surface additives, reference U.S. Pat. Nos. 4,560,635; 4,298,697; and, 4,338,390, the disclosures of which are totally incorporated herein by reference, subsequently transferring the image to a suitable substrate, and permanently affixing the image thereto.

A more complete understanding of the processes and apparatuses disclosed herein can be obtained by reference to the accompanying drawings. These figures are merely schematic representations based on convenience and the ease of demonstrating the present development, and are, therefore, not intended to indicate relative size and dimensions of the imaging members or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to component of like function.

With reference to FIG. 1, a photoconductive imaging member in accordance with the present disclosure is shown. Photoconductive imaging member 10 comprises a substrate 12, a charge generating or photogenerating layer 14, a first charge transport layer 16 1, a second charge transport layer 16 2, and an optional overcoating layer 18. The first charge transport layer 16 1 is formed from a first CTL formulation comprising an aromatic monoamine and a first polymeric film forming binder material in accordance with the present disclosure. The second charge transport layer 16 2 is formed from a second CTL formulation comprising an aromatic diamine and a second polymeric film forming binder material in accordance with the present disclosure.

It is to be understood herein, that if a "range" or "group" is mentioned with respect to a particular characteristic of the present disclosure, for example, percentage, chemical species, and temperature etc., it relates to and explicitly incorporates herein each and every specific member and combination of sub-ranges or sub-groups therein whatsoever. Thus, any specified range or group is to be understood as a shorthand way of referring to each and every member of a range or group individually as well as each and every possible sub-ranges or sub-groups encompassed therein; and similarly with respect to any sub-ranges or sub-groups therein.

In this regard, disclosed herein is a first CTL formulation comprising an aromatic monoamine and a first polymeric film forming binder material.

In another regard, disclosed herein is a second CTL formulation comprising an aromatic diamine and a second polymeric film forming binder material.

The aromatic monoamine of the present disclosure is defined as a compound that contains one amine group and one or more aryl groups. The aromatic diamine is defined as a compound that contains two amine groups and one or more aryl groups. The term aryl group is defined herein as a group derived from arene or heteroarene by removal of one or more hydrogen atoms.

In a variety of exemplary embodiments, aromatic monoamine of the present disclosure may be represented by the following formula $I_T$:

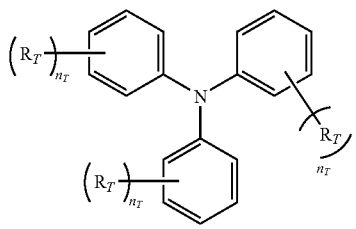

$I_T$ in which $n_T$ is independent of each other an integral number and $1 \leq n_T \leq 5$; and $R_T$ is independent of each other selected from the group consisting of hydrogen, $C_1$-$C_6$ alkyls, halo groups, and mixture thereof.

Exemplary aromatic monoamines include, but are not limited to, compounds with the following formulas:

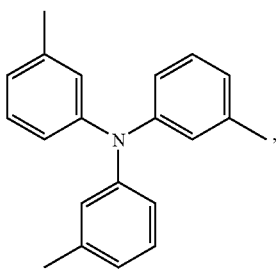

$T_1$

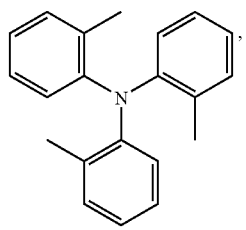

$T_2$ $T_3$ $T_4$

-continued $T_5$ $T_6$

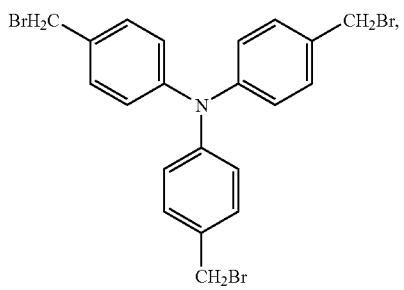

$T_7$

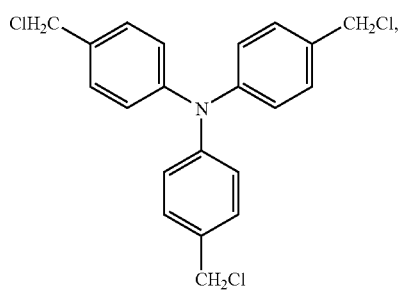

$T_8$

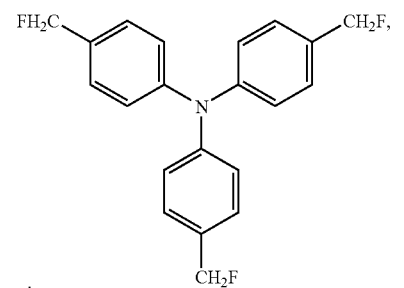

$T_9$

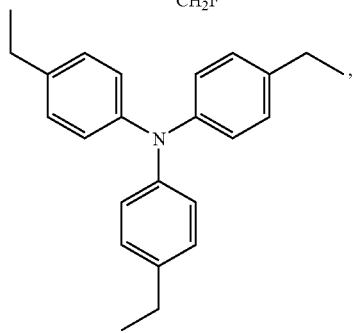

$T_{10}$

-continued
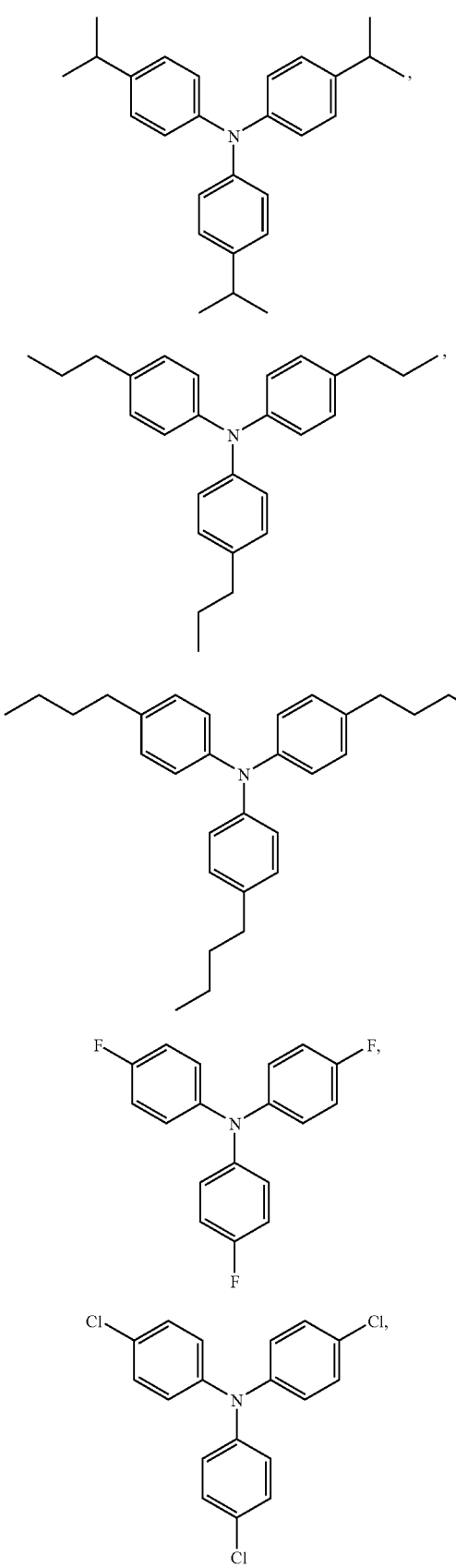
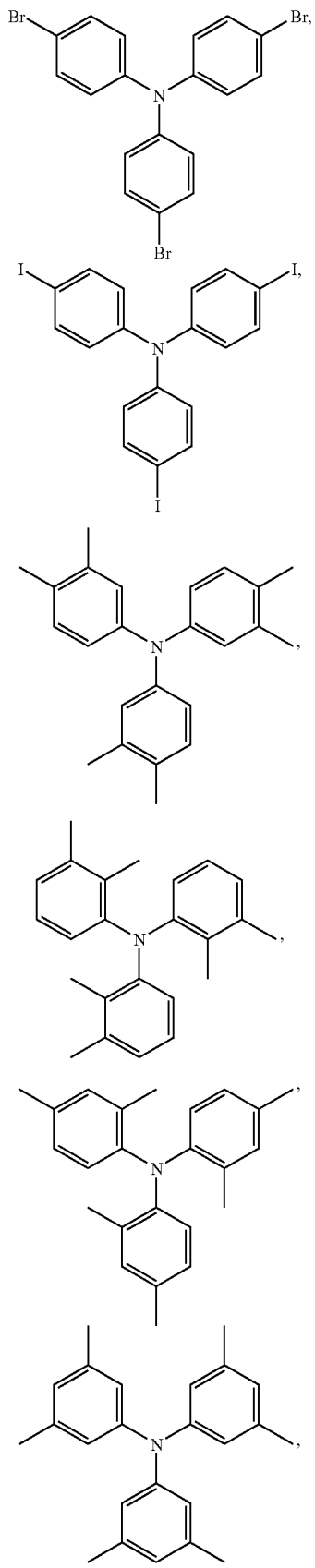

-continued

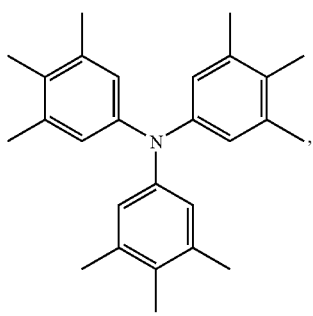

T₂₂ and the like.

In a specific embodiment, the aromatic monoamine of the first CTL formulation is the compound with formula $T_1$ as shown below (TTA):

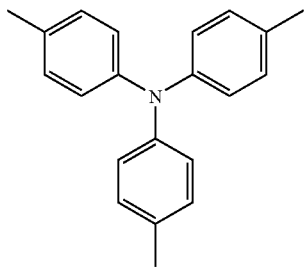

T₁

Optionally, one or more of other charge transporting compounds may be combined with the aromatic monoamine. Examples of such charge transporting compounds include, bur are not limited to, pyrene, carbazole, hydrazone, oxazole, oxadiazole, pyrazoline, arylmethane, benzidine, thiazole, stilbene and butadiene compounds; for example, pyrazolines such as 1-phenyl-3-(4'-diethylaminostyryl)-5-(4'-diethylamino phenyl)pyrazoline; hydrazones such as N-phenyl-N-methyl-3-(9-ethyl)carbazyl hydrazone and 4-diethyl amino benzaldehyde-1,2-diphenyl hydrazone; oxadiazoles such as 2,5-bis(4-N,N'-diethylaminophenyl)-1,2,4-oxadiazole; and the like.

Optionally, one or more of charge transporting polymers may be combined with the aromatic monoamine. Examples of charge transporting polymers include, but are not limited to, poly-N-vinylcarbazole, poly-N-vinylcarbazole halide, polyvinyl pyrene, polyvinylanthracene, polyvinylacridine, a pyrene-formaldehyde resin, polysilylenes, an ethylcarbazole-formaldehyde resin, polymeric arylamine compounds a triphenylmethane polymer and polysilane, and the like. More examples are described in U.S. Pat. Nos. 4,806,443, 4,806,444, 4,801,517, 4,818,650, 4,935,487 and 4,956,440, the disclosures of which are incorporated herein by reference in their entirety.

Based on the total weight of the first CTL formulation, the amount of the aromatic monoamine and other optional charge transporting compound(s) present in the first CTL formulation in accordance with the present disclosure is from about 95 to about 5 wt %, including from about 75 to about 15 wt %, and from about 60 to about 25 wt %.

It is believed that the aromatic monoamine such as TTA in the first CTL renders the belt photoreceptor having minimal curling problems.

Any suitable binder material may be employed as the first polymeric film forming binder material to form the matrix for the first charge transport layer. Typical polymeric film forming materials include those described, for example, in U.S. Pat. No. 3,121,006. Thus, the first polymeric film forming binder material may be thermoplastic and thermosetting resins which include, but are not limited to, polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrenebutadiene copolymers, vinylidenechloride-vinylchloride copolymers, vinylacetate-vinylidenechloride copolymers, styrene-alkyd resins, polyvinylcarbazole, and the like. These polymers may be block, random or alternating copolymers.

In a variety of exemplary embodiments, the first polymeric film forming binder material of the present disclosure may comprise a polycarbonate. Exemplary polycarbonates include poly(4,4'-isopropylidene-diphenylene)carbonate (also referred to as bisphenol-A-polycarbonate); poly(4,4'-cyclohexylidinediphenylene) carbonate (referred to as bisphenol-Z polycarbonate); poly(4,4'-isopropylidene-3,3'-dimethyl-diphenyl)carbonate (also referred to as bisphenol-C-polycarbonate); and the like. An example of commercially available Bisphenol A polycarbonate is Makrolon® 5705 from Farbensabricken Bayer A.G. Bayer Co., which has a molecular weight of about 170,000.

If desired, the first CTL formulation may further comprise a polymeric film forming binder material that not only functions as a binder, but also functions to improve electrical prosperities of photoreceptor. For example, TTA has cycle-up problem, and a polymer containing hydroxyl groups and/or carboxyl groups may be added to the first CTL formulation to overcome this problem. In a variety of exemplary embodiments, the polymer containing hydroxyl groups and/or carboxyl groups may comprise a polymeric film forming reaction product of at least vinyl chloride, vinyl acetate and hydroxyalkyl acrylate. The polymer may be prepared using conventional emulsion or suspension polymerization techniques. The chain length can be controlled by varying the reaction temperature and time. One embodiment of the polymer may be formed from a reaction mixture comprising from about 80 percent to about 90 percent by weight vinyl chloride, from about 3 percent to about 15 percent by weight vinyl acetate, and from about 6 percent to about 20 percent by weight hydroxyalkyl acrylate, based on the total weight of the reactants for the terpolymer. This terpolymer may be represented by the following formula:

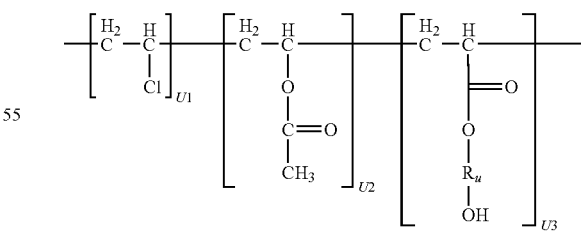

wherein $R_u$ is an alkylene group such as ethylene or propylene; U1 is the proportion of the polymer derived from vinyl chloride that is from about 80 percent to about 90 percent by weight, based on the total weight of the reactants for the terpolymer; U2 is the proportion of the polymer derived from vinyl acetate that is from about 3 percent to about 15 percent by weight, based on the total weight of the reactants for the terpolymer; and U3 is the proportion of the polymer derived from hydroxyalkyl acrylate that is from about 6 percent to about 20 percent by weight, based on the total weight of the reactants for the terpolymer.

Of course, the polymer containing hydroxyl groups and/or carboxyl groups in the first CTL formulation may be the reaction product of at least vinyl chloride, vinyl acetate, a hydroxyalkyl acrylate, and maleic acid, which may also be prepared using conventional emulsion or suspension polymerization techniques. One embodiment of the copolymer may be formed from a reaction mixture comprising from about 80 percent to about 90 percent by weight vinyl chloride, from about 3 percent to about 15 percent by weight vinyl acetate, from about 6 percent to about 20 percent by weight hydroxyalkyl acrylate, and from about 0.1 percent to about 0.5 percent by weight maleic acid, based on the total weight of the reactants for the tetrapolymer. This tetrapolymer may be represented by the following formula:

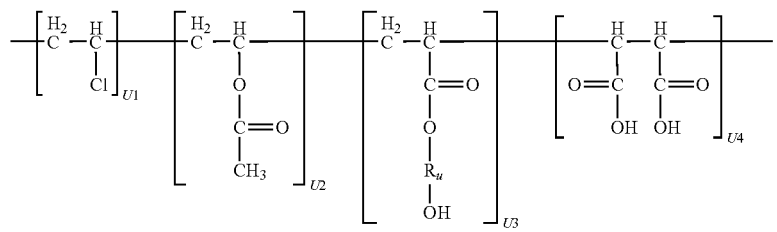

wherein $R_u$ is an alkylene group such as ethylene or propylene; U1 is the proportion of the polymer derived from vinyl chloride that is from about 80 percent to about 90 percent by weight, based on the total weight of the reactants for the tetrapolymer; U2 is the proportion of the polymer derived from vinyl acetate that is from about 3 percent to about 15 percent by weight, based on the total weight of the reactants for the tetrapolymer; U3 is the proportion of the polymer derived from hydroxyalkyl acrylate that is from about 6 percent to about 20 percent by weight, based on the total weight of the reactants for the tetrapolymer; and U4 is the proportion of the polymer derived from maleic acid that is from about 0.1 percent to about 0.5 percent by weight, based on the total weight of the reactants for the tetrapolymer.

Similarly, the polymer containing hydroxyl groups and/or carboxyl groups may comprise a terpolymer of vinyl chloride, vinyl acetate and vinyl alcohol such as VAGH, available from Union Carbide.

In a specific embodiment, the polymer containing hydroxyl groups and/or carboxyl groups of the first CTL formulation is a polymeric reaction product of 81 weight percent vinyl chloride, 4 weight percent vinyl acetate and 15 weight percent hydroxyethyl acrylate (VAGF, available from Union Carbide). VAGF is a terpolymer having a weight average molecular weight of about 33,000.

In another specific embodiment, the polymer containing hydroxyl groups and/or carboxyl groups of the first CTL formulation may be UCARMAG-527 available from Dow Chemical. UCARMAG-527 comprises a tetrapolymer reaction product of 81 weight percent vinyl chloride, 4 weight percent vinyl acetate, 0.28 weight percent maleic acid and 15 weight percent hydroxyethyl acrylate having a number average molecular weight (Mn) of about 35,000 and inherent viscosity 0.56.

Based on the total weight of the first CTL formulation, the amount of the first polymeric film forming binder material present in the first CTL formulation in accordance with the present disclosure is from about 100 to about 0.1 wt %, including from about 90 to about 10 wt %, and from about 80 to about 25 wt %. In a specific embodiment, the first CTL formulation comprises 4.0 g TTA (39.7%), 6.0 g Makrolon® 5705 (59.5%), and 0.08 g UCARMAG-527 (0.8%).

Optionally, a suitable antioxidant may be added in the first CTL formulation of the disclosure. Typically, the antioxidants used comprise a hindered phenol, hindered amine, thioether or phosphite. An antioxidant is effective for improvement of potential stability and image quality in environmental variation.

Exemplary hindered phenol antioxidants include, but are not limited to, Sumilizer BHT-R, Sumilizer MDP-S, Sumilizer BBM-S, Sumilizer WX-R, Sumilizer NR, Sumilizer BP-76, Sumilizer BP-101, Sumilizer GA-80, Sumilizer GM and Sumilizer GS (the above are manufactured by Sumitomo Chemical Co., Ltd.), IRGANOX 1010, IRGANOX 1035, IRGANOX 1076, IRGANOX 1098, IRGANOX 1135, IRGANOX 1141, IRGANOX 1222, IRGANOX 1330, IRGANOX 1425WL, IRGANOX 1520L, IRGANOX 245, IRGANOX 259, IRGANOX 3114, IRGANOX 3790, IRGANOX 5057 and IRGANOX 565 (the above are manufactured by Ciba Specialty Chemicals), and Adecastab AO-20, Adecastab AO-30, Adecastab AO-40, Adecastab AO-50, Adecastab AO-60, Adecastab AO-70, Adecastab AO-80 and Adecastab AO-330 (the above are manufactured by Asahi Denka Co., Ltd.).

Exemplary hindered amine antioxidants include, but are not limited to, Sanol LS2626, Sanol LS765, Sanol LS770, Sanol LS744, Tinuvin 144, Tinuvin 622LD, Mark LA57, Mark LA67, Mark LA62, Mark LA68, Mark LA63 and Sumilizer TPS. Exemplary thioether antioxidants include, but are not limited to, Sumilizer TP-D. Exemplary phosphite antioxidants include, but are not limited to, Mark 2112, Mark PEP 8, Mark PEP 24G, Mark PEP 36, Mark 329K and Mark HP 10 etc.

Based on the total weight of the first CTL formulation, the amount of antioxidant present in the first CTL formulation in accordance with the present disclosure is from about 50 to about 0.01 wt %, including from about 20 to about 0.1 wt %, and from about 10 to about 0.5 wt %.

If desired, other optional additives may be incorporated into the first CTL formulation of the present disclosure. The additives may be selected from the group consisting of a curing catalyst, a stabilizer, silane coupling agent, a deletion control agent, a surface energy control agent, inorganic and/or organic fillers, and mixture thereof. Based on the total weight of the first CTL formulation, the amount of the additive(s) present in the first CTL formulation in accordance with the present disclosure may be from about 20 to about 0.001 wt %, including from about 15 to about 0.01 wt %, and from about 10 to about 0.1 wt %.

Any suitable solvent may be used for the first CTL formulation. Typical solvents include, for example, methylene chloride, tetrahydrofuran, toluene and monochloro benzene, and the like. Generally, the solvent selected should dissolve all of the charge transport components and polymeric film forming binder used to form the first charge transport layer. In a specific embodiment, the solvent of the first CTL formulation is methylene chloride.

Generally, the amount of solvent used depends upon the type of coating technique employed to fabricate the imaging member. For example, less solvent is used for dip or immersion coating than for extrusion coating.

In a variety of exemplary embodiments, the aromatic monoamine and other optional charge transporting compound(s) are dissolved or molecularly dispersed in the first polymeric film forming binder material. The term "dissolved" is defined herein as forming a solution in which the molecules are dissolved in the polymer to form a homogeneous phase. The expression "molecularly dispersed" used herein is defined as charge transporting molecule dispersed in the polymer, the small molecules being dispersed in the polymer on a molecular scale.

Depending on specific imaging member to be fabricated, the thickness of the first charge transport layer may be from about 50 to about 0.01 micron, including from about 35 to about 1 micron, and from about 25 to about 5 micron. In a specific embodiment, the first charge transport layer is a 15 micron layer.

As described above, also disclosed herein is a second CTL formulation which comprises an aromatic diamine and a second polymeric film forming binder material.

In a variety of exemplary embodiments, aromatic diamine of the present disclosure may be represented by the following formula $I_D$:

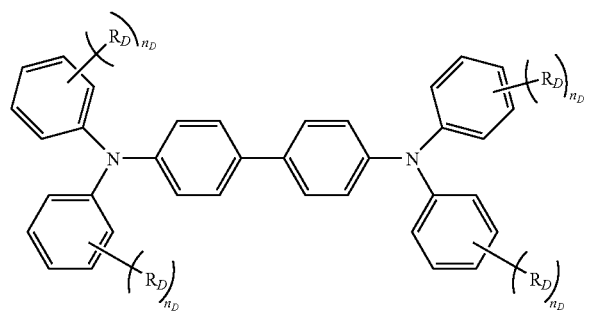

$I_D$ in which $n_D$ is independent of each other an integral number and $1 \leq n_D \leq 5$; and $R_D$ is independent of each other selected from the group consisting of hydrogen, $C_1$-$C_6$ alkyls, halo groups, and mixture thereof.

Exemplary aromatic diamines include, but are not limited to, compounds with the following formulas:

D1

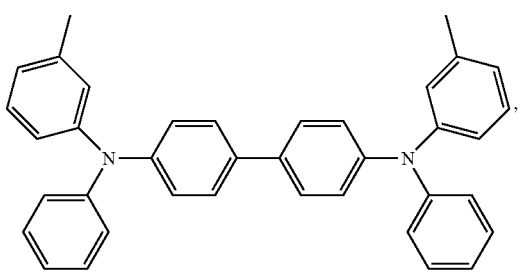

D2

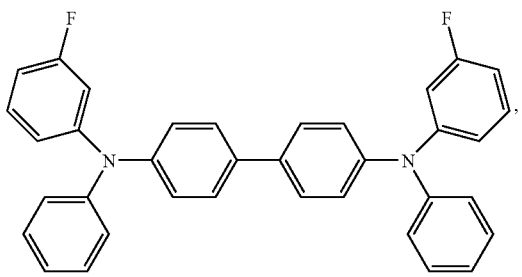

D3

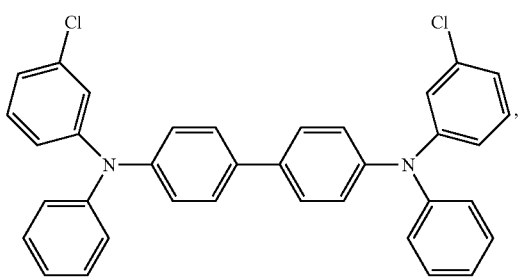

D4

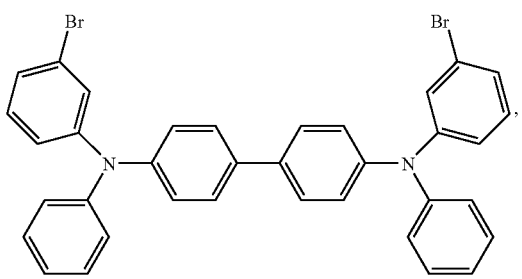

D5

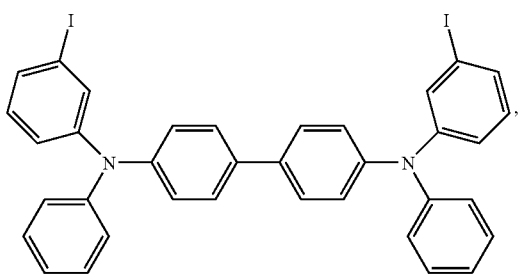

D6

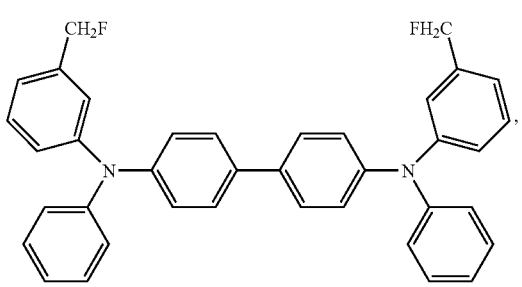

D7
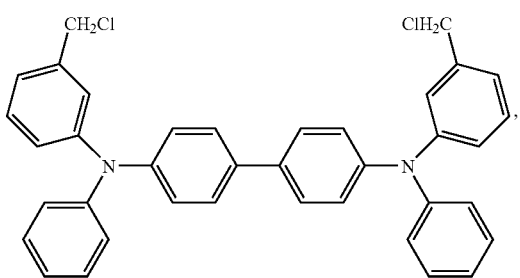
D8
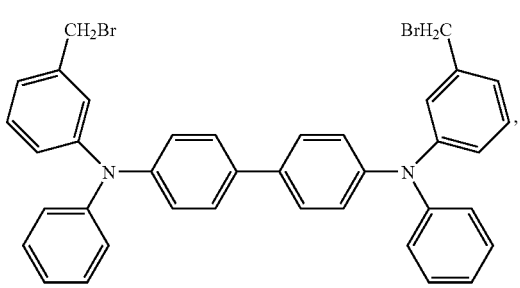
D9
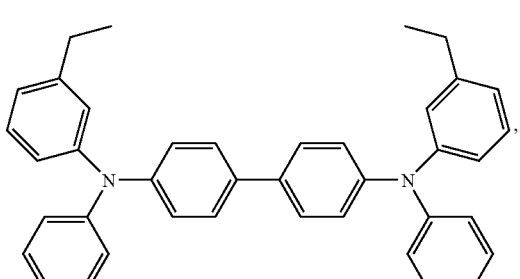
D10
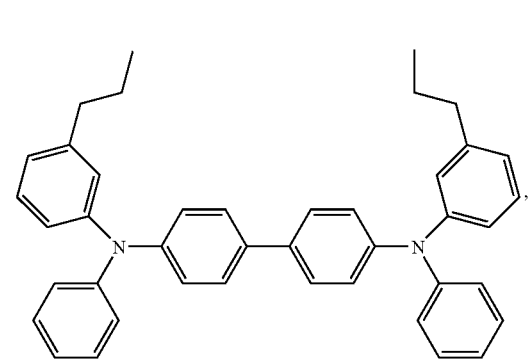
D11
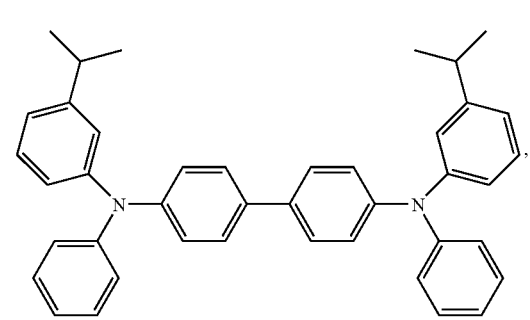
D12
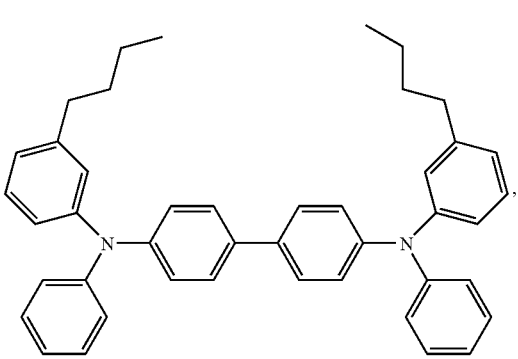
D13
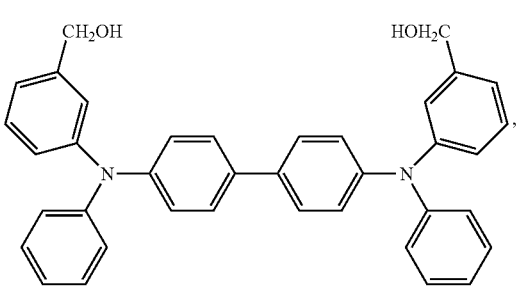
D14
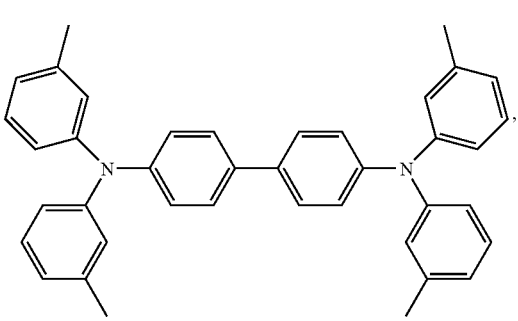
D15
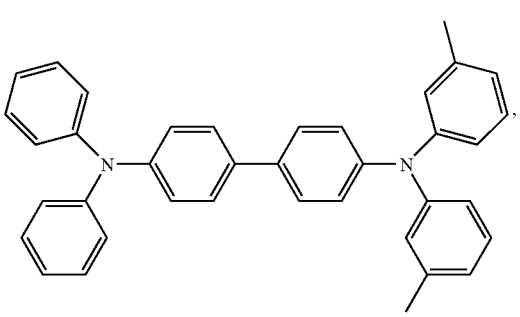
D16
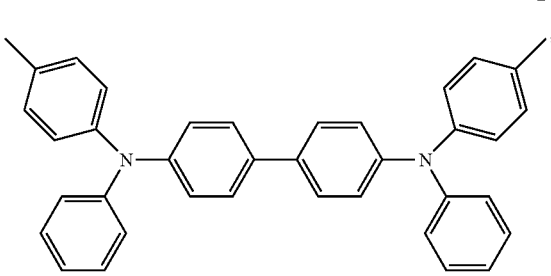

-continued

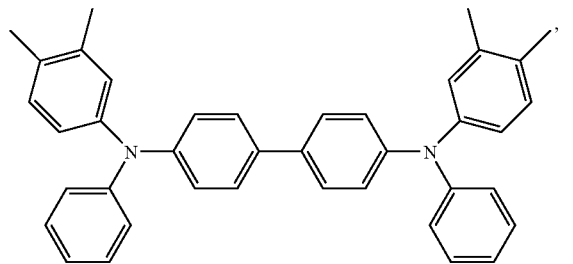

D17

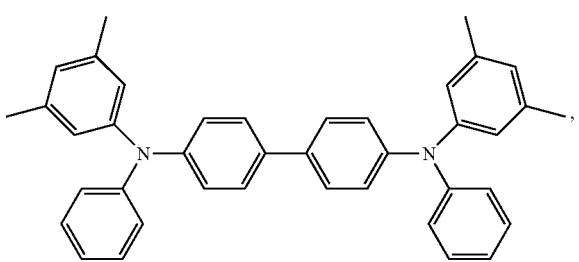

D18 and the like.

In a specific embodiment, aromatic diamine of the second CTL formulation is the compound of formula D1 (m-TBD) as shown below:

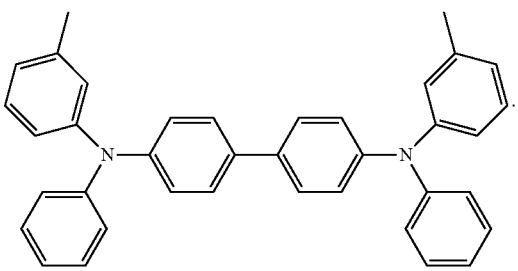

D1

Optionally, one or more of other charge transporting compounds may be combined with the aromatic diamine. Examples of such charge transporting compounds include, bur are not limited to, pyrene, carbazole, hydrazone, oxazole, oxadiazole, pyrazoline, arylmethane, benzidine, thiazole, stilbene and butadiene compounds; for example, pyrazolines such as 1-phenyl-3-(4'-diethylaminostyryl)-5-(4'-diethylamino phenyl)pyrazoline; hydrazones such as N-phenyl-N-methyl-3-(9-ethyl)carbazyl hydrazone and 4-diethyl amino benzaldehyde-1,2-diphenyl hydrazone; oxadiazoles such as 2,5-bis(4-N,N'-diethylaminophenyl)-1,2,4-oxadiazole; and the like.

Optionally, one or more of charge transporting polymers may be combined with the aromatic diamine. Examples of charge transporting polymers include, but are not limited to, poly-N-vinylcarbazole, poly-N-vinylcarbazole halide, polyvinyl pyrene, polyvinylanthracene, polyvinylacridine, a pyrene-formaldehyde resin, polysilylenes, an ethylcarbazole-formaldehyde resin, polymeric arylamine compounds a triphenylmethane polymer and polysilane, and the like. More examples are described in U.S. Pat. Nos. 4,806,443, 4,806, 444, 4,801,517, 4,818,650, 4,935,487 and 4,956,440, the disclosures of which are incorporated herein by reference in their entirety.

Based on the total weight of the second CTL formulation, the amount of aromatic diamine and other optional charge transporting compound(s) present in the second CTL formulation in accordance with the present disclosure is from about 5 to about 95 wt %, including from about 70 to about 15 wt %, and from about 60 to about 25 wt %.

Any suitable binder material may be employed as the second polymeric film forming binder material to form the matrix for the second charge transport layer. Although selection of the second polymeric film forming binder material is independent of the first polymeric film forming binder material, typically they are the same. General polymeric film forming materials include those described, for example, in U.S. Pat. No. 3,121,006. Thus, the second polymeric film forming binder material may be thermoplastic and thermosetting resins which include, but are not limited to, polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrenebutadiene copolymers, vinylidenechloride-vinylchloride copolymers, vinylacetate-vinylidenechloride copolymers, styrene-alkyd resins, polyvinylcarbazole, and the like. These polymers may be block, random or alternating copolymers.

In a variety of exemplary embodiments, the second polymeric film forming binder material of the present disclosure may comprise a polycarbonate. Exemplary polycarbonates include poly(4,4'-isopropylidene-diphenylene)carbonate (also referred to as bisphenol-A-polycarbonate); poly(4,4'-cyclohexylidinediphenylene) carbonate (referred to as bisphenol-Z polycarbonate); poly(4,4'-isopropylidene-3,3'-dimethyl -diphenyl)carbonate (also referred to as bisphenol-C-polycarbonate); and the like. An example of Bisphenol A polycarbonate is Makrolon® 5705 as described supra.

If desired, the second CTL formulation may also comprise a second polymeric film forming binder material that not only functions as a binder, but also functions to improve electrical prosperities of the photoreceptor. Such material may include a polymer containing hydroxyl groups and/or carboxyl groups. In a variety of exemplary embodiments, the polymer containing hydroxyl groups and/or carboxyl groups may comprise a polymeric film forming reaction product of at least vinyl chloride, vinyl acetate and hydroxyalkyl acrylate. One embodiment of the polymer may be formed from a reaction mixture comprising from about 80 percent to about 90 percent by weight vinyl chloride, from about 3 percent to about 15 percent by weight vinyl acetate, and from about 6 percent to about 20 percent by weight hydroxyalkyl acrylate, based on the total weight of the reactants for the terpolymer.

In a variety of exemplary embodiments, the polymer containing hydroxyl groups and/or carboxyl groups in the second CTL formulation may be the reaction product of at least vinyl chloride, vinyl acetate, a hydroxyalkyl acrylate, and maleic acid. One embodiment of the copolymer may be formed from a reaction mixture comprising from about 80 percent to about 90 percent by weight vinyl chloride, from about 3 percent to about 15 percent by weight vinyl acetate, from about 6 percent to about 20 percent by weight hydroxyalkyl acrylate, and from about 0.1 percent to about 0.5 percent by weight maleic acid, based on the total weight of the reactants for the tetrapolymer.

Similarly, the polymer containing hydroxyl groups and/or carboxyl groups may comprise a terpolymer of vinyl chloride, vinyl acetate and vinyl alcohol, such as VAGH available from Union Carbide; or a polymeric reaction product of 81 weight percent vinyl chloride, 4 weight percent vinyl acetate and 15 weight percent hydroxyethyl acrylate (VAGF, available from Union Carbide).

In another specific embodiment, the polymer containing hydroxyl groups and/or carboxyl groups of the first CTL formulation may be UCARMAG-527 as described supra.

Based on the total weight of the second CTL formulation, the amount of the second polymeric film forming binder material present in the second CTL formulation in accordance with the present disclosure is from about 100 to about 0.1 wt %, including from about 90 to about 10 wt %, and from about 80 to about 25 wt %.

Optionally, a suitable antioxidant may be added in the second CTL formulation of the disclosure. Typically, the antioxidants used comprise a hindered phenol, hindered amine, thioether or phosphite. Examples of antioxidants have been described supra. An antioxidant is effective for improvement of potential stability and image quality in environmental variation.

In a specific embodiment, the antioxidant in the second CTL formulation is tetrakis[methylene(3,5-di-tert-butyl-4-hydroxy hydrocinnamate)]methane (Irganox®-1010), which is commercially available from Ciba-Geigy Corporation.

Based on the total weight of the second CTL formulation, the amount of antioxidant present in the second CTL formulation in accordance with the present disclosure is from about 50 to about 0.01 wt %, including from about 20 to about 0.1 wt %, and from about 10 to about 0.5 wt %.

If desired, other optional additives may be incorporated into the second CTL formulation of the present disclosure. The additives may be selected from the group consisting of a curing catalyst, a stabilizer, silane coupling agent, a deletion control agent, a surface energy control agent, inorganic and/or orgqanic fillersand mixture thereof. Based on the total weight of the second CTL formulation, the amount of the additive(s) present in the second CTL formulation in accordance with the present disclosure may be from about 20 to about 0.001 wt %, including from about 15 to about 0.01 wt %, and from about 10 to about 0.1 wt %. In a specific embodiment, the second CTL formulation comprises 4.66 g m-TBD (46.6%), 4.56 g Makrolon® 5705 (45.6%), 0.1 g UCARMAG-527 (1.0%), and 0.68 g Irganox®-1010 (6.8%).

Any suitable solvent may be used for the second CTL formulation. Typical solvents include, for example, methylene chloride, tetrahydrofuran, toluene and monochloro benzene, and the like. Generally, the solvent selected should dissolve all of the components used to form the second charge transport layer. In a specific embodiment, the solvent of the second CTL formulation is methylene chloride.

Generally, the amount of solvent used depends upon the type of coating technique employed to fabricate the imaging member. For example, less solvent is used for dip or immersion coating than for extrusion coating.

In a variety of exemplary embodiments, the aromatic diamine and other optional charge transporting compound(s) are dissolved or molecularly dispersed in the second polymeric film forming binder material.

Depending on specific imaging member to be fabricated, the thickness of the second charge transport layer may be from about 50 to about 0.01 micron, including from about 35 to about 1 micron, and from about 25 to about 5 micron. In a specific embodiment, the second charge transport layer is a 15 micron layer, for example, a 15 micron standard Galaxy SMTL.

Combination of the first charge transport layer and the second charge transport layer gives a design commonly called "two-pass CTL" or "dual CTL structure". As a skilled artisan can understand, two-pass coating process may be employed to fabricate such a device.

It was found that the charge transport layer (CTL) plays a big role in curling the device.

On one hand, it is known that belt photoreceptors with aromatic monoamine hole transport material such as tri(3-methylphenyl)amine (TTA) and a binder such as polycarbonate in CTL do not exhibit curling problems. However, a CTL based solely on TTA/polycarbonate possesses electrical problems such as cycle-up and high residual voltage as well as a low $T_g$. It is believed that these problems are related to the chemical property of TTA. As such, few photoreceptor devices use TTA alone as charge transport material in the CTL.

On the other hand, if a CTL contains an aromatic diamine hole transport material such as N,N'-diphenyl-N,N'-bis(3-methylphenyl)-(1,1'-biphenyl)-4,4'-diamine (m-TBD) and a binder such as polycarbonate, the photoreceptor device tends to curl badly. But this kind of device has very good electrical properties.

Therefore, the present disclosure providing a photoconductive imaging member comprising two charge transport layers, the first of which is formed from a an aromatic monoamine such as TTA, and the second of which is formed from aromatic diamine such as m-TBD.

This is a new charge transport layer design for flexible xerographic photoreceptors. The design eliminates the need for an anti-curl backing coating (ACBC) coating layer to compensate for the stress imbalance caused by thermal expansion and residual solvent mass transport differences between the substrate and SMTL layers. The design gives less internal stress imbalance resulting in little or no upward curling of the photoreceptor. The design solves the curl problem while the device maintains excellent electrical and physical properties by using dual CTL structure. Additionally, this new design does not need any change in current manufacturing process. All additives to the CTL can be maintained.

In a specific embodiment, a two-pass coating process is used to make the TTA and SMTL layers combined with use of an acid such as UCARMAG-527 to achieve the desired electrical performance. For example, the first CTL is a 15 micron layer of TTA with a polycarbonate binder between a 15 micron standard Galaxy SMTL and a substrate (PEN).

In a specific embodiment, the first charge transport layer, which is typically a low $T_g$ layer, is kept away from the photoreceptor surface and the addition of an acid such as UCARMAG-527 improves its electrical performance.

The present disclosure also relates to a method of preparing an imaging member such as photoreceptor. The method comprises (i) providing a substrate, (ii) coating a charge generation layer above the substrate, (iii) coating a first charge transport layer above the charge generation layer, (iv) coating a second charge transport layer above the first charge transport layer, and (v) optionally coating an overcoat layer above the second charge transport layer. As describe supra, the first charge transport layer is formed from a first CTL formulation comprising an aromatic monoamine and a first polymeric film forming binder material. As describe supra, the second charge transport layer is formed from a second CTL formulation comprising aromatic diamine and a second polymeric film forming binder material.

An imaging member may be prepared by any suitable techniques that are well known in the art. Although rigid substrate may be contemplated within the scope of the present disclosure, typically a flexible substrate layer is provided. The flexible substrate support layer can be formed of a conductive material. Alternatively, a conductive layer can be formed on top of a nonconductive flexible substrate support layer.

The charge generation layer is then applied to the electrically conductive surface. A charge blocking layer or undercoat layer may optionally be applied to the electrically conductive surface prior to the application of the charge generation layer, for example, when an organic photoreceptor is to be fabricated. If desired, an adhesive layer may be utilized between the charge blocking layer and the charge generation layers. Usually the charge generation layer is applied onto the blocking layer and the charge transport layers of the present disclosure are formed on the charge generation layer. This structure may have the charge generation layer on top of or below the charge transport layers. For example, a charge generation layer may be sandwiched between conductive surface and charge transport layer; or a charge transport layer may be sandwiched between a conductive surface and a charge generation layer. This structure may be imaged in the conventional xerographic manner which usually includes charging, optical exposure and development.

The substrate may be opaque or substantially transparent and may comprise any suitable material having the required mechanical properties. Accordingly, the substrate may comprise a layer of an electrically non-conductive or conductive material such as an inorganic or an organic composition. As electrically non-conducting materials, there may be employed various resins known for this purpose including polyesters, polycarbonates, polyamides, polyurethanes, and the like, which are flexible as thin webs. An electrically conducting substrate may be any metal, for example, aluminum, nickel, steel, copper, and the like; or a polymeric material, as described above, filled with an electrically conducting substance, such as carbon, metallic powder, and the like; or an organic electrically conducting material. The electrically insulating or conductive substrate may be in the form of an endless flexible belt, a web, a rigid cylinder, a sheet, and the like.

The thickness of the substrate layer depends on numerous factors, including strength desired and economical considerations. For an electrophotographic imaging member such as a drum, this layer may be of substantial thickness of, for example, up to many centimeters or of a minimum thickness of less than a millimeter. Similarly, a flexible belt may be of substantial thickness, for example, about 250 micrometers, or of minimum thickness less than 50 micrometers, provided there are no adverse effects on the final electrophotographic device.

In embodiments where the substrate layer is not conductive, the surface thereof may be rendered electrically conductive by an electrically conductive coating. The conductive coating may vary in thickness over substantially wide ranges depending upon the optical transparency, degree of flexibility desired, and economic factors. Accordingly, for a flexible photoresponsive imaging device, the thickness of the conductive coating may be generally from about 20 angstroms to about 750 angstroms, and typically from about 100 angstroms to about 200 angstroms for an optimum combination of electrical conductivity, flexibility and light transmission. The flexible conductive coating may be an electrically conductive metal layer formed, for example, on the substrate by any suitable coating technique, such as a vacuum depositing technique or electrodeposition. Typical metals include aluminum, zirconium, niobium, tantalum, vanadium, hafnium, titanium, nickel, stainless steel, chromium, tungsten, molybdenum, and the like. For example, a continuous metal film can be attained on a suitable substrate, e.g. a polyester web substrate such as Mylar available from E.I. DuPont de Nemours & Co. with magnetron sputtering.

If desired, an alloy of suitable metals may be deposited. Typical metal alloys may contain two or more metals such as zirconium, niobium, tantalum, vanadium, hafnium, titanium, nickel, stainless steel, chromium, tungsten, molybdenum, and the like, and mixtures thereof. A typical electrical conductivity for conductive layers for electrophotographic imaging members in slow speed copiers is about $10^2$ to $10^3$ ohms/square.

In a specific embodiment of the present disclosure, the substrate support is comprised of a flexible 3½ mil thick biaxially polyethylene naphthalate (PEN Kaladex, available from DuPont). The substrate may be metallized to provide a 100 angstrom conductive titanium surface.

An optional hole blocking layer or undercoat may be applied to the substrate. Any suitable and conventional blocking layer capable of forming an electronic barrier to holes between the adjacent photoconductive layer and the underlying conductive surface of a substrate may be utilized. The blocking layer may comprise nitrogen containing siloxanes or nitrogen containing titanium compounds, such as trimethoxysilyl propylene diamine, hydrolyzed trimethoxysilyl propyl ethylene diamine, N-β-(aminoethyl) γ-amino -propyl trimethoxy silane, isopropyl 4-aminobenzene sulfonyl, di(dodecylbenzene sulfonyl) titanate, isopropyl di(4-aminobenzoyl)isostearoyl titanate, isopropyl tri(N -ethylaminoethylamino)titanate, isopropyl trianthranil titanate, isopropyl tri(N,N-dimethylethylamino)titanate, titanium-4-amino benzene sulfonate oxyacetate, titanium 4-aminobenzoate isostearate oxyacetate, $[H_2N(CH_2)_4]CH_3Si(OCH_3)_2$, (γ-aminobutyl)methyl diethoxysilane, and $[H_2N(CH_2)_3]CH_3Si(OCH_3)_2$, (γ-aminopropyl)methyl diethoxysilane, as disclosed in U.S. Pat. Nos. 4,338,387, 4,286,033 and 4,291,110, the disclosures of which are incorporated herein in their entirety. An exemplary blocking layer comprises a reaction product between a hydrolyzed silane and the oxidized surface of a metal ground plane layer. The blocking layer may be applied by any suitable conventional technique such as spraying, dip coating, draw bar coating, gravure coating, silk screening, air knife coating, reverse roll coating, vacuum deposition, chemical treatment and the like. The blocking layer should be continuous and have a thickness of less than about 0.2 micrometer because greater thicknesses may lead to undesirably high residual voltage.

Any suitable adhesive layer well known in the art may optionally be applied to the hole blocking layer or undercoat layer. Typical adhesive layer materials include, for example, polyesters, polyurethanes, and the like. Satisfactory results may be achieved with adhesive layer thickness from about 0.05 micrometer (500 angstroms) to about 0.3 micrometer (3,000 angstroms). Conventional techniques for applying an adhesive layer coating mixture to the charge blocking layer include spraying, dip coating, roll coating, wire wound rod coating, gravure coating, Bird applicator coating, and the like. Drying of the deposited coating may be effected by any suitable conventional technique such as oven drying, infra red radiation drying, air drying and the like.

At least one electrophotographic imaging layer is formed on the adhesive layer, hole blocking layer or substrate. The electrophotographic imaging layer may be a single layer that performs both charge generating and charge transport functions as is well known in the art or it may comprise multiple layers such as a charge generation layer and a charge transport layer.

Charge generation layers may comprise amorphous selenium, triggonal selenium, and alloys of selenium and arsenic, tellurium, germanium and the like, hydrogenated amorphous silicon and compounds of silicon and germanium, carbon, oxygen, nitrogen, and the like fabricated by, for example, vacuum evaporation or deposition. The charge generation layers may also comprise inorganic pigments of crystalline selenium and its alloys; Group II-VI compounds; and organic pigments and dyes such as quinacridones, polycyclic pigments such as dibromo anthanthrone pigments, perylene and perinone diamines, polynuclear aromatic quinones, azo pigments including bis-, tris-and tetrakis-azos; quinoline pigments, indigo pigments, thioindigo pigments, bisbenzimidazole pigments, phthalocyanine pigments, quinacridone pigments, lake pigments, azo lake pigments, oxazine pigments, dioxazine pigments, triphenylmethane pigments, azulenium dyes, squalium dyes, pyrylium dyes, triallylmethane dyes, xanthene dyes, thiazine dyes, cyanine dyes, and the like dispersed in a film forming polymeric binder and fabricated by solvent coating techniques.

In an embodiment, phthalocyanines may be employed as photogenerating materials for use in laser printers utilizing infrared exposure systems. Infrared sensitivity is required for photoreceptors exposed to low cost semiconductor laser diode light exposure devices. The absorption spectrum and photosensitivity of the phthalocyanines depend on the central metal atom of the compound. Many metal phthalocyanines have been reported and include, for example, oxyvanadium phthalocyanine, chloroaluminum phthalocyanine, copper phthalocyanine, oxytitanium phthalocyanine, chlorogallium phthalocyanine, hydroxygallium phthalocyanine magnesium phthalocyanine and metal-free phthalocyanine. The phthalocyanines exist in many crystal forms which have a strong influence on photogeneration.

Any suitable polymeric film forming binder material may be employed as the matrix in the charge generating (photogenerating) binder layer. Typical polymeric film forming materials include those described, for example, in U.S. Pat. No. 3,121,006, the entire disclosure of which is incorporated herein by reference. Thus, typical organic polymeric film forming binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloride-vinylchloride copolymers, vinylacetate-vinylidenechloride copolymers, styrene-alkyd resins, polyvinylcarbazole, and the like. These polymers may be block, random or alternating copolymers.

A photogenerating composition or pigment may be present in the resinous binder composition in various amounts. Generally, however, from about 5 percent by volume to about 90 percent by volume of the photogenerating pigment is dispersed in about 10 percent by volume to about 95 percent by volume of the resinous binder, and typically from about 20 percent by volume to about 30 percent by volume of the photogenerating pigment is dispersed in about 70 percent by volume to about 80 percent by volume of the resinous binder composition. The photogenerator layers can also fabricated by vacuum sublimation in which case there is no binder.

Any suitable and conventional technique may be utilized to mix and thereafter apply the photogenerating layer coating mixture. Typical application techniques include spraying, dip coating, roll coating, wire wound rod coating, vacuum sublimation and the like. For some applications, the generator layer may be fabricated in a dot or line pattern. Removing of the solvent of a solvent coated layer may be effected by any suitable conventional technique such as oven drying, infrared radiation drying, air drying and the like.

Any suitable and conventional technique may be utilized to mix and thereafter apply the first and second CTL formulations as described supra, to the charge generation layer. Typical application techniques include spraying, dip coating, roll coating, wire wound rod coating, and the like. Drying of the deposited coating may be effected by any suitable conventional technique such as oven drying, infra red radiation drying, air drying and the like.

In general, the thickness ratio between the sum of the first and the second charge transport layers of the present disclosure and the charge generation layer is typically maintained from about 2:1 to 200:1 and in some instances as great as 400:1. Typically, a charge transport layer is substantially non-absorbing to visible light or radiation in the region of intended use but is electrically "active" in that it allows the injection of photogenerated holes from the photoconductive layer, i.e., charge generation layer, and allows these holes to be transported through itself to selectively discharge a surface charge on the surface of the active layer.

Optionally, other layers may also be used such as conventional electrically-conductive ground strip along one edge of the belt or drum in contact with the conductive layer, blocking layer, adhesive layer or charge generation layer to facilitate connection of the electrically conductive layer of the photoreceptor to ground or to an electrical bias. Ground strips are well known and usually comprise conductive particles dispersed in a film forming binder.

Optionally, an overcoat layer (OCL) may also be utilized to improve resistance to abrasion. OCL has been shown to increase the mechanical life of an OPC by as much as 10-fold. The overcoat layer is well known in the art and may comprise thermoplastic organic polymers or inorganic polymers that are electrically insulating or slightly semi-conductive.

The thickness of the overcoat layer depends upon the abrasiveness of the charging (e.g., bias charging roll), cleaning (e.g., blade or web), development (e.g., brush), transfer (e.g., bias transfer roll), etc., in the electrophotographic imaging system employed. Generally, the overcoat layer thickness may range up to about 10 micrometers. A typical thickness is from about 1 micrometer to about 5 micrometers.

Any suitable and conventional technique may be utilized to mix and thereafter apply the overcoat layer coating mixture to the charge transport/generating layer. Typical application techniques include spraying, dip coating, roll coating, wire wound rod coating, and the like. Drying of the deposited coating may be effected by any suitable conventional technique such as oven drying, infrared radiation drying, air drying and the like.

The dried overcoat should transport holes during imaging and should not have too high free carrier concentration. Free carrier concentration in an overcoat increases the dark decay.

It is desirable that the dark decay of the overcoated layer is about the same as, or is close to, that of an unovercoated counterpart.

According to the present disclosure, a method of imaging is provided. The imaging method comprises generating an electrostatic latent image on an imaging member comprising a first charge transport layer and a second charge transport layer as described supra, developing the latent image, and transferring the developed electrostatic image to a suitable substrate.

The imaging member such as photoreceptor according to the present disclosure may be incorporated into various imaging systems such as those conventionally known as xerographic imaging devices or electrophotographic image forming devices. Additionally, the imaging members may be selected for imaging and printing systems with visible, near-red and/or infrared light. In this embodiment, the imaging members may be negatively or positively charged, exposed to light having a wavelength of from about 700 to about 900, such as generated by solid state layers, e.g., arsenide-type lasers, either sequentially or simultaneously, followed by developing the resulting image and transferring it to a print substrate such as transparency or paper. Additionally, the imaging members may be selected for imaging and printing systems with visible light. In this embodiment, the imaging members may be negatively or positively charged, exposed to light having a wavelength of from about 400 to about 700 nanometers, followed by development with a known toner, and then transferring and fixing of the image on a print substrate.

In an embodiment, an image forming device may comprise the imaging member as discussed above, a charging device, an electrostatic image forming station, an image developing station, and an image transfer station.

In an embodiment, the image forming device may be used to generate images with the photoreceptor disclosed herein. Generally, the imaging member may be first charged with a corona charging device such as a corotron, dicorotron, scorotron, pin charging device, bias charging roll (BCR) or the like. Then, an electrostatic image is generated on the imaging member with an electrostatic image forming device. Subsequently, the electrostatic image is developed by known developing devices at one or more developing stations that apply developer compositions such as, for example, compositions comprised of resin particles, pigment particles, additives including charge control agents and carrier particles, etc., reference being made to, for example, U.S. Pat. Nos. 4,558,108; 4,560,535; 3,590,000; 4,264,672; 3,900,588 and 3,849,182, the disclosures of each of these patents being totally incorporated herein by reference. The developed electrostatic image is then transferred to a suitable print substrate such as paper or transparency at an image transfer station, and affixed to the substrate. Development of the image may be achieved by a number of methods, such as cascade, touchdown, powder cloud, magnetic brush, and the like.

Transfer of the developed image to a print substrate may be by any suitable method, including those wherein a corotron or a biased roll is selected. The fixing step may be performed by means of any suitable method, such as flash fusing, heat fusing, pressure fusing, vapor fusing, and the like.

Following transfer of the developed image from the imaging member surface, the imaging member may be cleaned of any residual developer remaining on the surface, and also cleaned of any residual electrostatic charge prior to being subjected to charging for development of a further or next image.

Specific embodiments of the disclosure will now be described in detail. These examples are intended to be illustrative, and the disclosure is not limited to the materials, conditions, or process parameters set forth in these embodiments. All parts and percentages are by weight unless otherwise indicated.

EXAMPLE 1

Formulations

All the materials in this new proposal were used directly as received. m-TBD was purchased from Sankio Ltd., TTA was purchased from Eastman Kodak Co. Polycarbonate (Makrolon® 5705) from Bayer Co. has weight average molecular weight ($M_w$) 170,000. Vinyl chloride copolymer [poly(vinyl chloride-co-vinyl acetate-co-hydroxypropyl acrylate-co-maleic acid)], with number average molecular weight (Mn) 35,000 and inherent viscosity 0.56, was purchased from Dow Chemical with brand name UCARMAG-527. Methylene chloride in HPLC grade was purchased from Fisher Scientific. Tetrakis[methylene(3,5-di-tert-butyl-4-hydroxy hydrocinnamate)]methane (Irganox®-1010) was purchased from Ciba-Geigy Corporation. The first CTL formulation and the second formulation are shown in Table 1 below.

TABLE 1

| Sample | HTM | Polymer Binder | UCARMAG-527 | Solvent Methylene Chloride | Additive |
|---|---|---|---|---|---|
| The 1$^{st}$ CTL formulation | TTA: 4.0 g | Makrolon: 6.0 g | 0.08 g | 61 g | None |
| The 2$^{nd}$ CTL formulation | m-TBD: 4.66 g | Makrolon: 4.56 g | 0.1 g | 50 g | Irganox: 0.68 g |

All samples were stirred at room temperature until clear solutions were obtained. Because TTA has the inherent cycle-up problem, UCARMAG-527 was added to overcome this problem in the 1$^{st}$ CTL formulation. Because the m-TBD/polycarbonate CTL (the 2$^{nd}$ CTL formulation) was designed to be on the top of the device, so antioxidant Irganox-1010 was added to minimize the deletion problem, and UCARMAG-527 was added to control the electrical properties of the upper layer also.

EXAMPLE 2

Coating

The solutions of Example 1 were coated as charge transport layer (CTL) on standard Xerox belt photoreceptor substrate coated up to charge generation layer (CGL) [HOGaPC/PcZ, Constellation generator layer] respectively. First, the solution comprising the 1$^{st}$ CTL formulation was coated on the CGL to be about 15 micrometers thick. The device was dried at 110° C. for 30 minutes, and cooled to room temperature. Then the solution comprising the 2$^{nd}$ CTL formulation was coated on this device to be about 15 micrometers thick. The full finished photoreceptor device was dried at 110° C. for another 30 minutes. So the total thickness of the CTL was about 30 micrometers. The structure of this new designed photoreceptor device is shown in FIG. 1, except that the optional overcoat layer 18 is omitted.

EXAMPLE 3

Electrical Test

According to standard Constellation belt photoreceptor test in Xerox photoreceptor product, the full photoreceptor devices prepared from Example 2 were measured for electrical properties on a drum scanner which was the same method described in U.S. Pat. No. 6,875,548, herein incorporated by reference.

Figure 2:
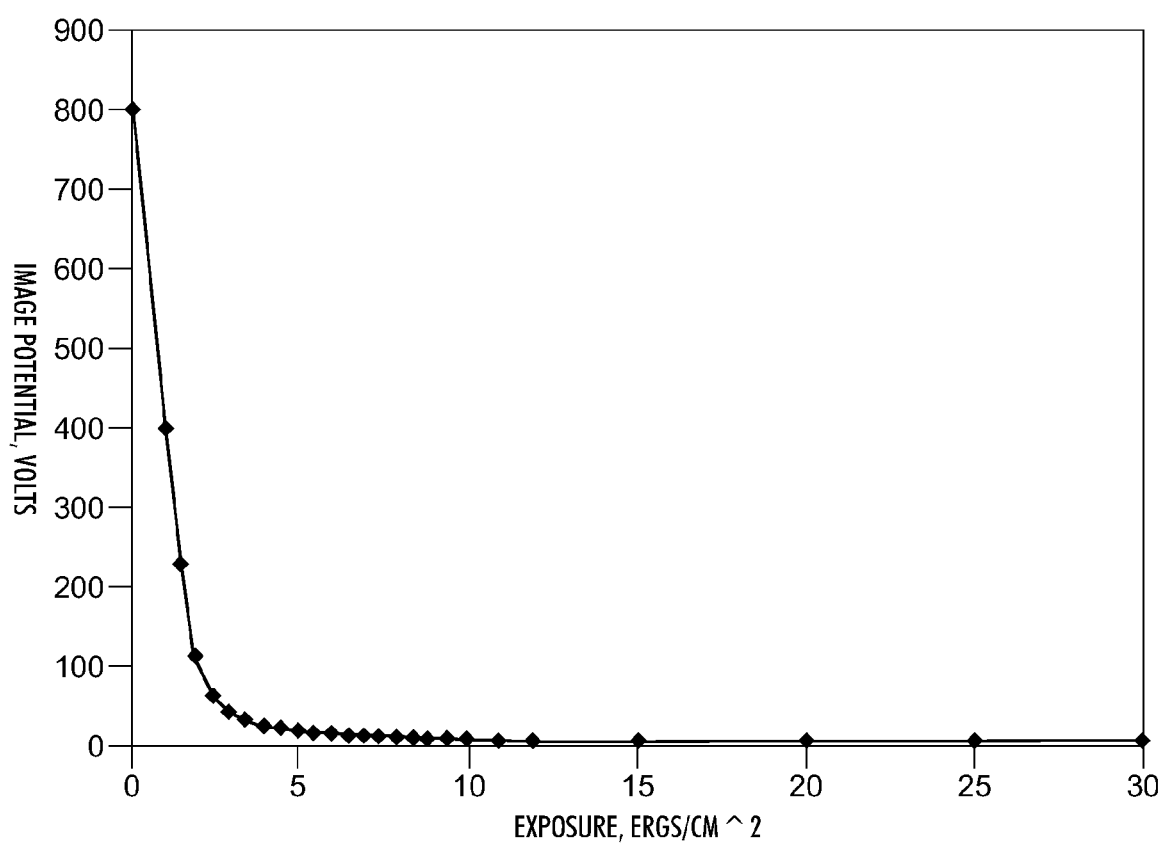
FIG. 2 shows the photoinduced discharge curve (PIDC) of a photoreceptor that is fabricated according to an embodiment of the present disclosure.

The essential characteristic of the photoreceptor is the photoinduced discharge curve (PIDC), which relates the voltage on the photoreceptor to the light exposure. The shape of this curve is governed by an electric-field-dependent quantum efficiency, the mobility of the photogenerated carriers, and charge trapping. The PIDC of the photoreceptor prepared from Example 2 is shown in FIG. 2.

The electrical properties summary of this new designed device is tabulated in Table 2.

TABLE 2

| | Photoreceptor | | | | | |
|---|---|---|---|---|---|---|
| | $V_0$ (volt) | S | $V_c$ (volt) | $V_r$ (volt) | $V_{dd}$ | $V_{depl}$ | V10k-cycle-up |
| Example 2 | 795 | 422 | 146 | 4.5 | −30.7 | 28.6 | −10.8 |

In Table 2, V0 is the dark voltage after scorotron charging; S is the initial slope of the PIDC, which is a measurement of sensivity; Vc is the surface potential at which PIDC slope is S/2; Vr is the residual voltage; $V_{depl}$ is the difference between applied voltage and V0; $V_{dd}$ is 0.2s duration dark decay voltage; $V_{cyc-up}$ is the residual change after 10000 cycling test From the above, this new designed photoreceptor device had excellent electrical performance. When this belt device was heated at 135° C. for 30 minutes, and then was cooled to room temperature, it showed negligible curling. So even without ACBC, this new designed photoreceptor device still can solve the curling problem by dual-CTL coatings.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. An imaging member comprising, in sequence,
a substrate,
a charge generation layer,
a first charge transport layer,
a second charge transport layer,
and an optional overcoat layer;
in which the first charge transport layer is formed from a first CTL formulation comprising a first solvent, an aromatic monoamine, and a first polymer containing either hydroxyl groups or carboxyl groups; and
in which the second charge transport layer is formed from a second CTL formulation comprising a second solvent, an aromatic diamine, a second polymer, and an antioxidant;

wherein the aromatic monoamine is represented by the following formula $I_T$:

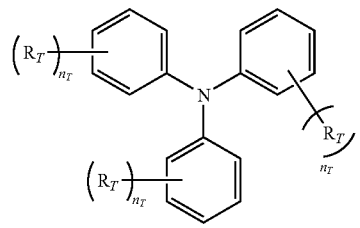

wherein each $n_T$ is independently an integral number and $1 \leq n_T \leq 5$; and each $R_T$ is independently selected from the group consisting of hydrogen, $C_1$-$C_6$ alkyl, halo groups, and mixtures thereof;

wherein the aromatic diamine is represented by the following formula $I_D$:

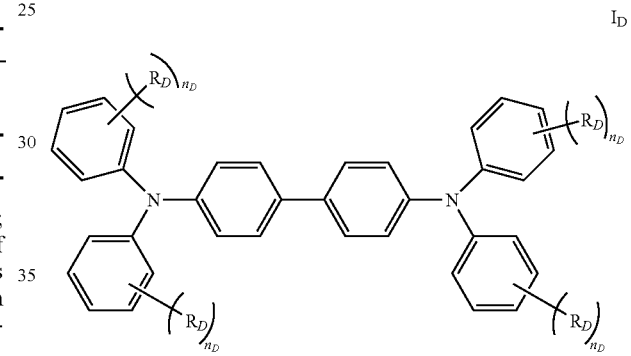

wherein each $n_D$ is independently an integral number and $1 \leq n_D \leq 5$; and each $R_D$ is independently selected from the group consisting of hydrogen, $C_1$-$C_6$ alkyl, halo groups, and mixtures thereof; and wherein the first polymer is either (a) a polymeric film forming reaction product of at least vinyl chloride, vinyl acetate, and hydroxyalkyl acrylate; or (b) a terpolymer of vinyl chloride, vinyl acetate, and vinyl alcohol.

2. The imaging member according to claim 1, in which the aromatic monoamine is a compound having one of the following formulas:

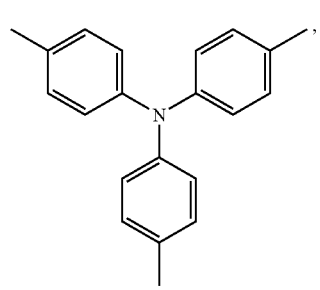

-continued
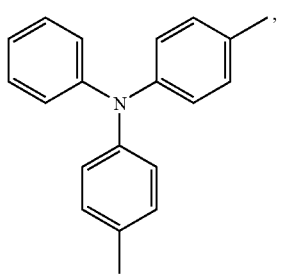 T₂
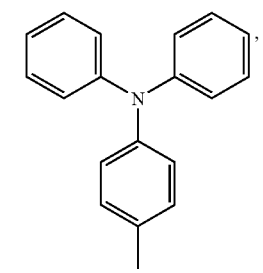 T₃
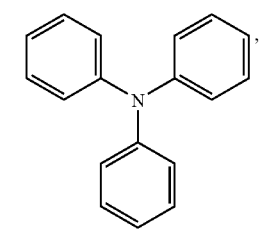 T₄
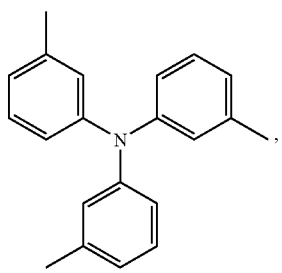 T₅
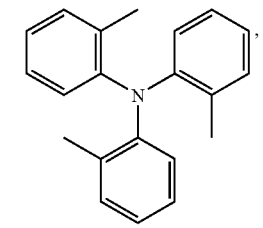 T₆
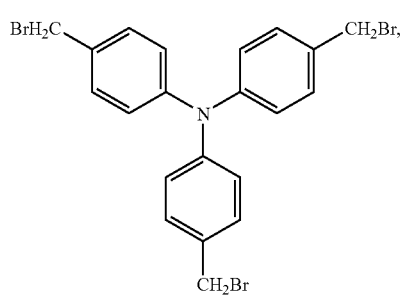 T₇
-continued
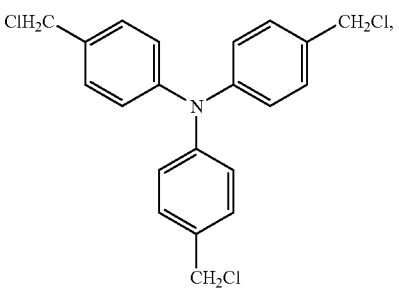 T₈
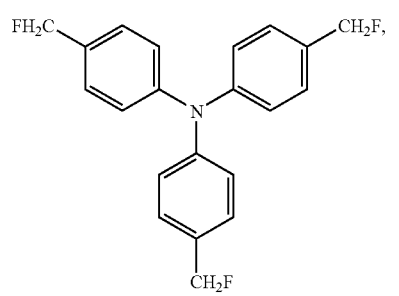 T₉
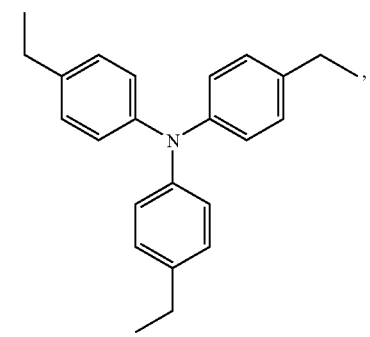 T₁₀
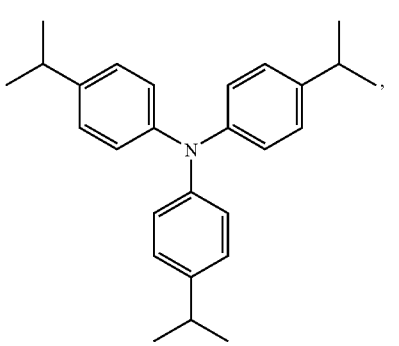 T₁₁
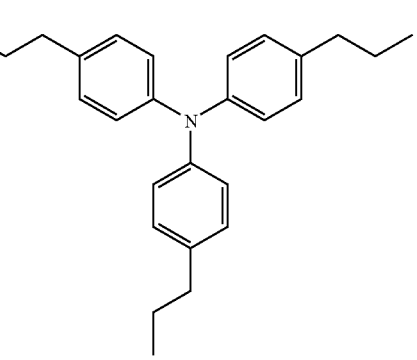 T₁₂

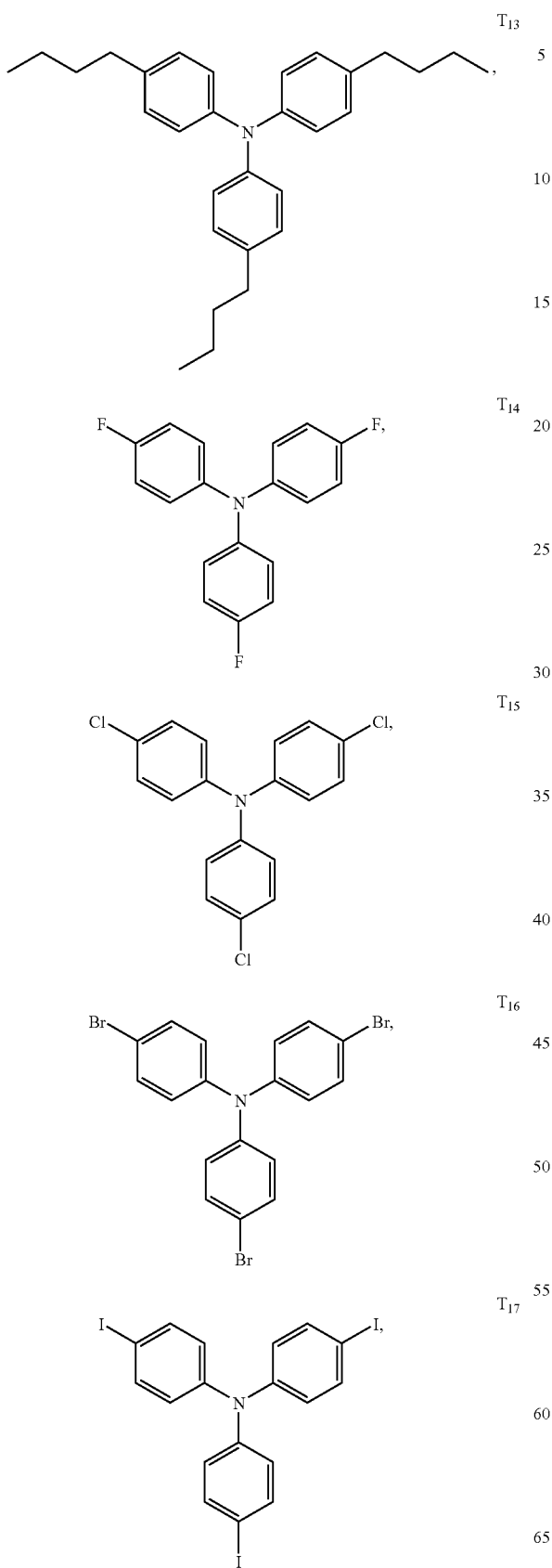

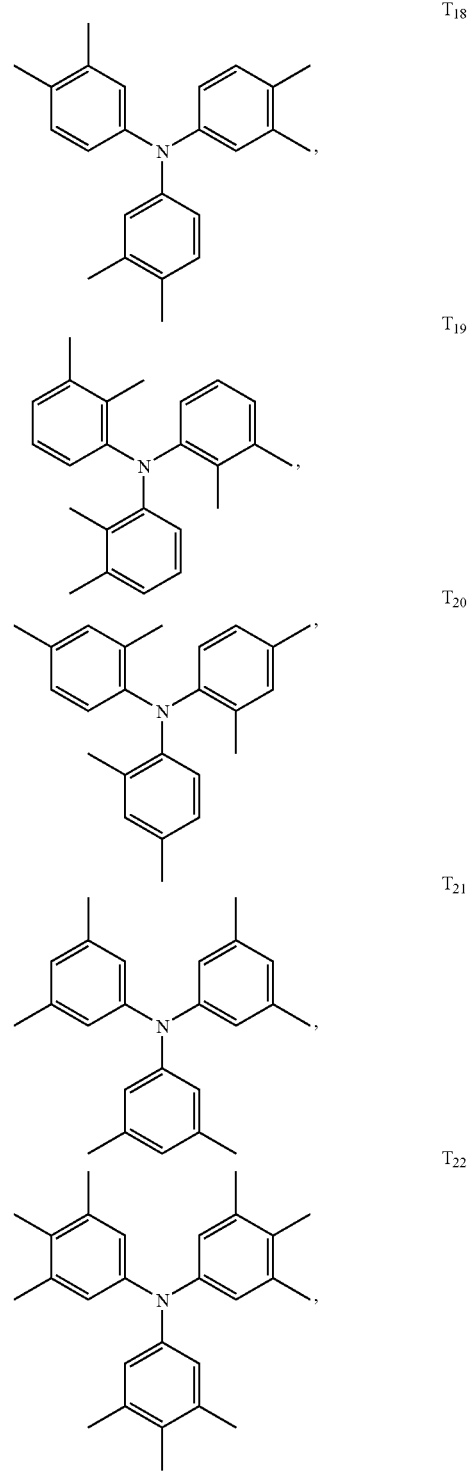

and mixtures thereof.

3. The imaging member according to claim 1, in which the amount of the aromatic monoamine present in the first CTL formulation is from about 95 to about 5 wt %, based on the total weight of the first CTL formulation.

4. The imaging member according to claim 1, in which the first charge transport layer further comprises a first polymeric film forming binder material selected from the group consisting of polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrenebutadiene copolymers, vinylidenechloride-vinylchloride copolymers, vinylacetate-vinylidenechloride copolymers, vinylidenechloride-vinylchloride copolymers, styrene-alkyd resins, polyvinylcarbazole, and mixture thereof.

5. The imaging member according to claim 4, in which the first polymeric film forming binder material is a polycarbonate selected from the group consisting of poly(4,4'-isopropylidene-diphenylene)carbonate (bisphenol-A -polycarbonate); poly(4,4'-cyclohexylidinediphenylene) carbonate (bisphenol-Z polycarbonate); poly(4,4'-isopropylidene-3,3'-dimethyl-diphenyl)carbonate (bisphenol-C-polycarbonate); and the mixture thereof.

6. The imaging member according to claim 1, in which the first polymer containing either hydroxyl groups or carboxyl groups is a tetrapolymer represented by the following formula:

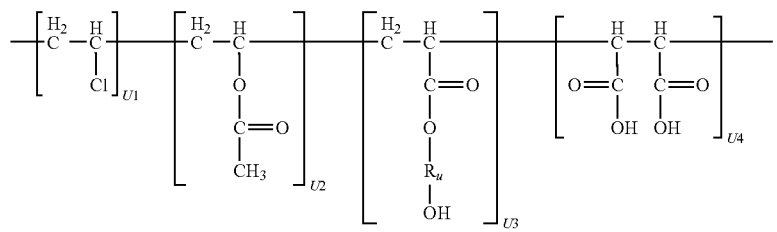

wherein $R_u$ is an alkylene group; and, based on the total weight of the reactants for the tetrapolymer, U1 is the vinyl chloride proportion that is from about 80 percent to about 90 percent, U2 is the vinyl acetate proportion that is from about 3 percent to about 15 percent, U3 is the hydroxyalkyl acrylate proportion that is from about 6 percent to about 20 percent, and U4 is the maleic acid proportion that is from about 0.1 percent to about 0.5 percent.

7. The imaging member according to claim 1, in which the amount of the first polymer present in the first CTL formulation is from about 95 to about 5 wt %, based on the total weight of the first CTL formulation.

8. The imaging member according to claim 1, in which the thickness of the first charge transport layer is from about 50 to about 0.01 micron.

9. The imaging member according to claim 1, in which the aromatic diamine is a compound having one of the following formulas:

D1

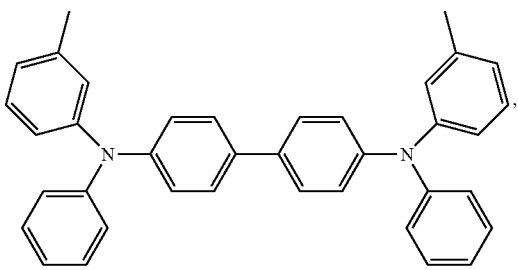

-continued

D2

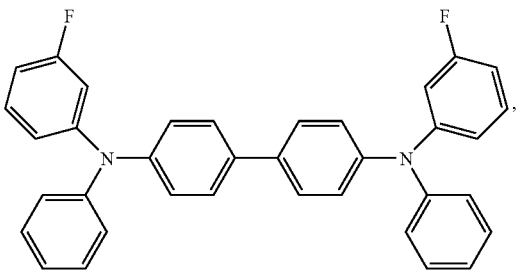

D3

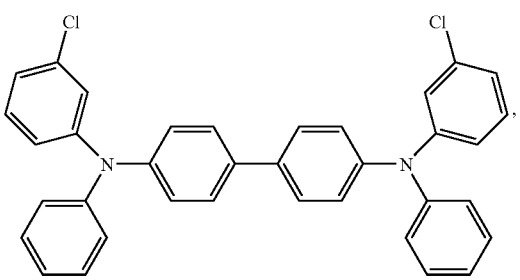

-continued

D4

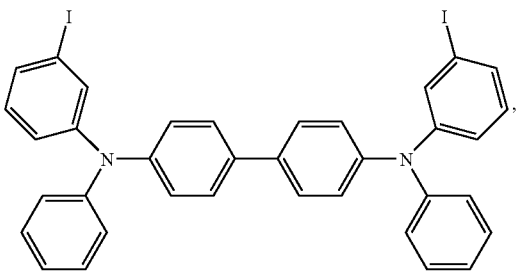

D5

-continued
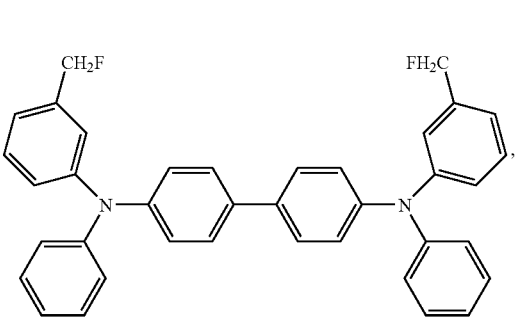
D6
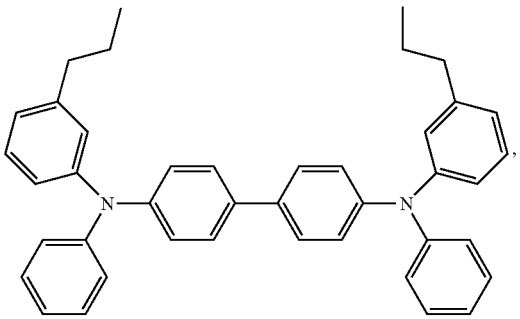
D10
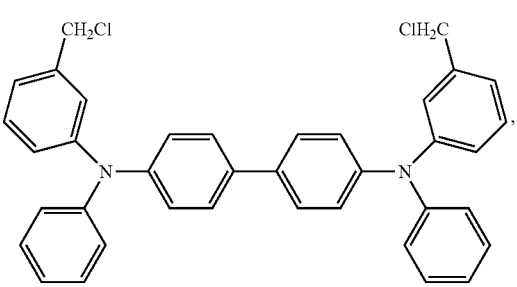
D7
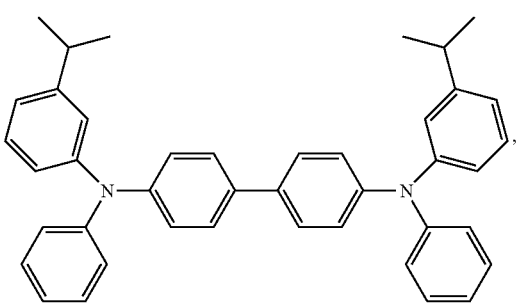
D11
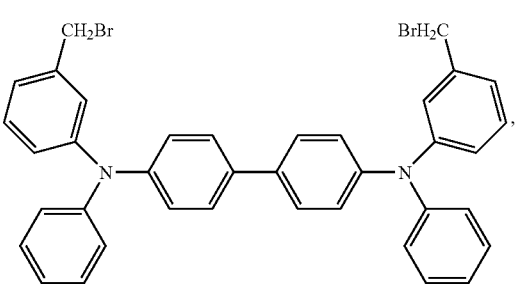
D8
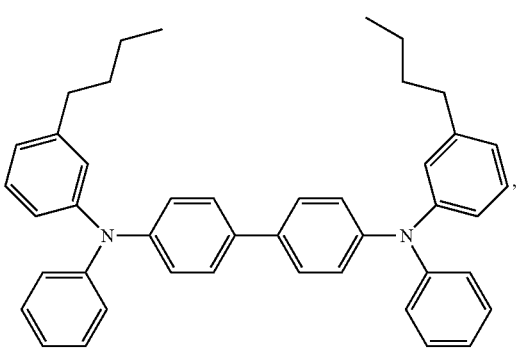
D12
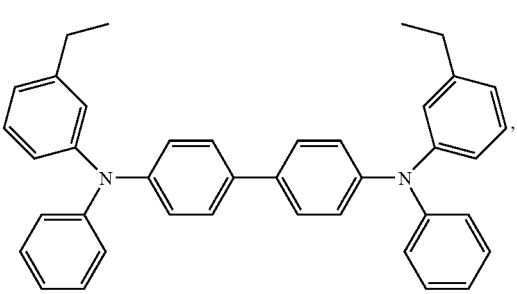
D9
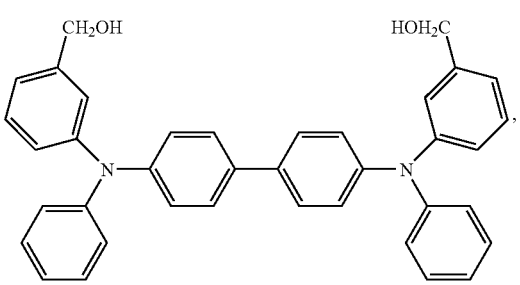
D13

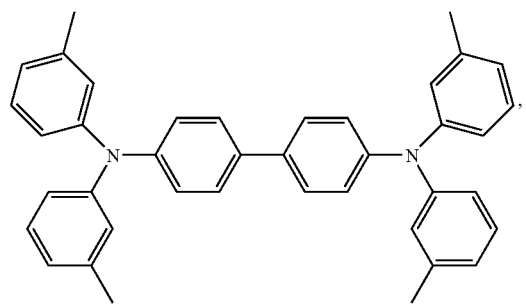
D14

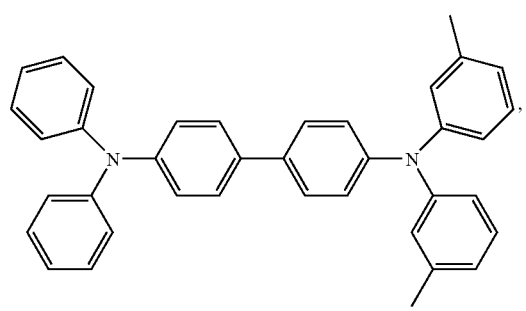
D15

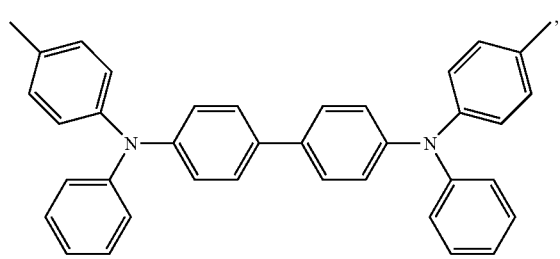
D16

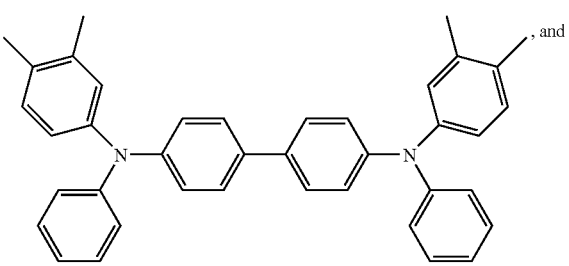
D17, and

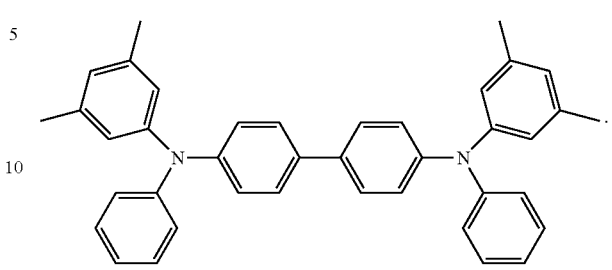
D18

10. The imaging member according to claim 1, in which the amount of the aromatic diamine present in the second CTL formulation is from about 95 to about 5 wt %, based on the total weight of the first CTL formulation.

11. The imaging member according to claim 1, wherein the second polymer is selected from the group consisting of polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrenebutadiene copolymers, vinylidenechloride-vinylchloride copolymers, vinylacetate-vinylidenechloride copolymers, styrene-alkyd resins, polyvinylcarbazole, and mixture thereof.

12. The imaging member according to claim 11, in which the second polymer is a polycarbonate selected from the group consisting of poly(4,4'-isopropylidene-diphenylene) carbonate (bisphenol-A-polycarbonate); poly(4,4'-cyclohexylidinediphenylene) carbonate (bisphenol-Z polycarbonate); poly(4,4'-isopropylidene-3,3'-dimethyl-diphenyl) carbonate (bisphenol-C-polycarbonate); and mixtures thereof.

13. The imaging member according to claim 1, in which the second polymer is a tetrapolymer represented by the following formula:

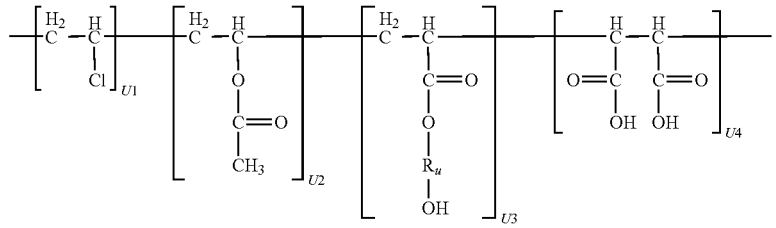

wherein $R_u$, is an alkylene group; and, based on the total weight of the reactants for the tetrapolymer, U1 is the vinyl chloride proportion that is from about 80 percent to about 90 percent, U2 is the vinyl acetate proportion that is from about 3 percent to and about 15 percent, U3 is the hydroxyalkyl acrylate proportion that is from about 6 percent to about 20 percent, and U4 is the maleic acid proportion that is from about 0.1 percent to about 0.5 percent.

14. The imaging member according to claim 1, in which the amount of the second polymer present in the second CTL formulation is from about 95 to about 5 wt %, based on the total weight of the second CTL formulation.

15. The imaging member according to claim 1, in which the thickness of the second charge transport layer is from about 50 to about 0.01 micron.

16. A method of imaging which comprises generating an electrostatic latent image on the imaging member of claim 1, developing the latent image, and transferring the developed electrostatic image to a suitable substrate.

17. The imaging member according to claim 1, in which the first polymer is a terpolymer represented by the following formula:

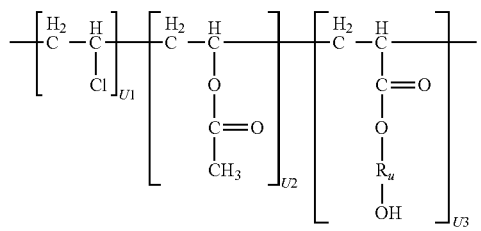

wherein $R_u$ is an alkylene group; and, based on the total weight of the reactants for the terpolymer, U1 is the vinyl chloride proportion that is from about 80 percent to about 90 percent, U2 is the vinyl acetate proportion that is from about 3 percent to about 15 percent, and U3 is the hydroxyalkyl acrylate proportion that is from about 6 percent to about 20 percent.

18. The imaging member according to claim 1, in which the second polymer is a terpolymer represented by the following formula:

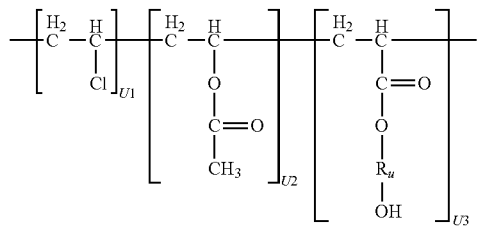

wherein $R_u$ is an alkylene group; and, based on the total weight of the reactants for the terpolymer, U1 is the vinyl chloride proportion that is from about 80 percent to about 90 percent, U2 is the vinyl acetate proportion that is from about 3 percent to and about 15 percent, and U3 is the hydroxyalkyl acrylate proportion that is from about 6 percent to about 20 percent.

19. An imaging member comprising, in sequence,
a substrate,
a charge generation layer,
a first charge transport layer,
a second charge transport layer,
and an optional overcoat layer;
in which the first charge transport layer is formed from a first CTL formulation consisting of a first solvent, an aromatic monoamine, a first polymer containing either hydroxyl groups or carboxyl groups, and an optional first polymeric film forming binder material; and
in which the second charge transport layer is formed from a second CTL formulation consisting of a second solvent, an aromatic diamine, a second polymer containing either hydroxyl groups or carboxyl groups, an antioxidant, and an optional second polymeric film forming binder material;
wherein the first polymer and the second polymer are independently either (a) a polymeric film forming reaction product of at least vinyl chloride, vinyl acetate, and hydroxyalkyl acrylate; or (b) a terpolymer of vinyl chloride, vinyl acetate, and vinyl alcohol;
wherein the aromatic monoamine is represented by the following formula $I_T$:

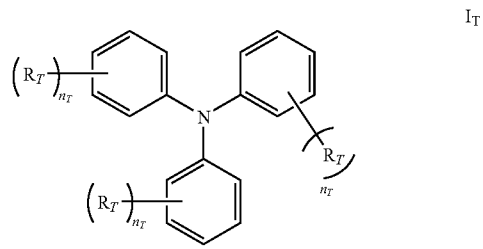

wherein each $n_T$ is independently an integral number and $1 \leq n_T \leq 5$; and each $R_T$ is independently selected from the group consisting of hydrogen, $C_1$-$C_6$ alkyl, halo groups, and mixtures thereof; and
wherein the aromatic diamine is represented by the following formula $I_D$:

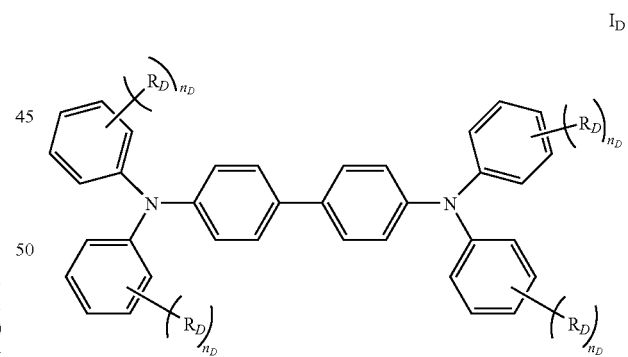

wherein each $n_D$ is independently an integral number and $1 \leq n_D \leq 5$; and each $R_D$ is independently selected from the group consisting of hydrogen, $C_1$-$C_6$ alkyl, halo groups, and mixtures thereof.

* * * * *